(12) United States Patent  
Komano et al.

(10) Patent No.: US 7,496,759 B2  
(45) Date of Patent: Feb. 24, 2009

(54) MULTISIGNATURE METHOD, APPARATUS, PROGRAM, AND SYSTEM

(75) Inventors: Yuichi Komano, Kawasaki (JP); Kazuo Ohta, Chofu (JP); Shinichi Kawamura, Kodaira (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 11/037,089

(22) Filed: Jan. 19, 2005

(65) Prior Publication Data

US 2005/0201561 A1 Sep. 15, 2005

(30) Foreign Application Priority Data

Jan. 23, 2004 (JP) ............................. 2004-016109

(51) Int. Cl.  
*H04L 9/00* (2006.01)

(52) U.S. Cl. ..................... 713/176; 713/168; 713/150

(58) Field of Classification Search ................. 713/176, 713/168, 150  
See application file for complete search history.

(56) References Cited

U.S. PATENT DOCUMENTS 6,266,771 B1 7/2001 Bellare et al.

OTHER PUBLICATIONS

Two Threshold Multisignature Schemes from Bilinear Pairings Guowen Li; Jia Yu; Rupeng Li; Daxing Li; Multimedia and Ubiquitous Engineering, 2007. MUE '07. International Conference on Apr. 26-28, 2007 pp. 1041-1045.*

Signtiming scheme based on aggregate signature Duc-Phong Le; Bonnecaze, A.; Gabillon, A.; Intelligence and Security Informatics, 2008. ISI 2008. IEEE International Conference on Jun. 17-20, 2008 pp. 145-149.*

A Secure Improved Multi-signature Scheme Li, Hu'an; Zhang, Jianhong; Communication Technology, 2006. ICCT '06. International Conference on Nov. 2006 pp. 1-5.*

An extended-shadow-code based approach for off-line signature verification. II. Evaluation of several multi-classifier combination strategies; Sabourin, R.; Genest, G.; Document Analysis and Recognition, 1995., Proceedings of the Third International Conference on vol. 1, Aug. 14-16, 1995 pp. 197-201 vol. 1.*

Shirow Mitomi, et al. "A General Model of Multisignature Schemes with Message Flexibility, Order Flexibility, and Order Verifiability", IEICE Trans. Fundamentals., vol. E84-A, No. 10, Oct. 2001, pp. 2488-2499.

* cited by examiner

*Primary Examiner*—David Y Jung  
(74) *Attorney, Agent, or Firm*—Oblon, Spivak, McClelland, Maier & Neustadt, P.C.

(57) ABSTRACT

According to embodiments of the present invention, in a case where a ground for security is laid in difficulty in executing an inverse function operation of a trapdoor one-way function, represented by an RSA problem, even when a signature order advances, an increase of a size of a key can be inhibited. For example, when the first partial data $\sigma_{i-1,L}$ exceeding $(k_0+k_1)$ bits when concatenating a random number $r_i$ of $k_0$ bits is excluded from an input of binary operation on an input side of a signature generation function. Accordingly, a size of an operation result $s_i$ of the binary operation is set to be constant at $(k_0+k_2)$ bits, and, as a result, an input size (key length k bits) of an RSA signature generation function is set to be constant.

33 Claims, 9 Drawing Sheets

MULTISIGNATURE METHOD, APPARATUS, PROGRAM, AND SYSTEM

CROSS-REFERENCE TO RELATED APPLICATIONS

This application is based upon and claims the benefit of priority from prior Japanese Patent Application No. 2004-016109, filed Jan. 23, 2004, the entire contents of which are incorporated herein by reference.

BACKGROUND OF THE INVENTION

1. Field of the Invention

The present invention relates to a multisignature method in which a plurality of signers successively perform a signature generating process with respect to a certain document to thereby generate one signature, apparatus, program, and system.

2. Description of the Related Art

In general, a cryptosystem can be classified into two types: a common key cryptosystem; and a public key cryptosystem. The public key cryptosystem has an advantage that a necessity for key distribution raising problem in a common key system is obviated.

For example, in the public key cryptosystem, users A, B, . . . generate a set of a public key and a secret key, and register the public key in a public list. The respective users A, B, . . . may prepare one set of keys regardless of the total number of users. At the time of use, for example, the user A generates a ciphertext using the public key of the user B in the public list, and transmits the ciphertext to the user B. The user B decodes the received ciphertext with self secret key. Thus, the public key cryptosystem obviates the necessity for the key distribution between the users A, B. Examples of a representative public key cryptosystem include a Rivest-Shamir-Adleman (RSA) cryptosystem, an ElGamal cryptosystem, an elliptic curve cryptosystem and the like.

In the above-described public key cryptosystem, a trapdoor one-way function is utilized. The trapdoor one-way function is such a function that operation in a certain direction can be easily executed, whereas it is difficult to execute operation in an opposite direction without any confidential information.

Therefore, the public key cryptosystem has a property that an arbitrary user can easily execute the generation of the ciphertext (operation in the certain direction) using the public key in the public list, and a property that it is difficult to execute the decoding of the ciphertext (operation in the opposite direction) without any secret key.

When the properties are used in a manner opposite to that of the cryptosystem, a signature system is realized. In the signature system, an only signer who has confidential information can generate a signature which can be verified by the third party. For example, the respective users A, B, . . . generate a set of the public key and the secret key, and register the public key in the public list. At the use time, for example, the user A generates a signature from the document using the self secret key, and transmits the document and the signature to the user B. The user B allows the public key of the user A in the public list to act on the signature and the document, and verifies validity of the signature. Examples of a representative signature system include RSA signature, digital signature algorithm (DSA), elliptic curve digital signature algorithm (ECDSA) and the like.

Examples of a technique to which such signature system is applied include a multisignature system. In the multisignature system, a plurality of signers successively perform a signature generation process with respect to a certain document, and generate one signature. The multisignature system is considered, for example, as a technique which electronically realizes a system for circulating the document in an organization to successively put approval seals.

As a technique which brings about an effect similar to that of the multisignature system, a concatenating signature system is considered in which the respective signers generate signatures with respect to a certain document, and the obtained respective signatures are concatenated together.

Here, the multisignature system refers to a system in which a size of the generated multisignature can be set to be smaller than that of the concatenated signature. Next, outlines of the multisignature system and the concatenating signature system will be described. FIG. 1A shows the outline of the multisignature system, and FIG. 1B shows the outline of the concatenating signature system.

In FIG. 1A, User 1 who is a first signer generates Signature 1 with respect to Document x, and thereafter sends Document x and Signature 1 to User 2 who is a second signer. User 2 generates "Signatures 1•2" utilizing Signature 1 as the signature with respect to Document x. "Signature 1•2" is a signature which assures that Users 1, 2 have both approved Document x, and is generated with a size smaller than that of data obtained by concatenating Signature 1 of User 1 to Signature 2 of User 2. Subsequently, a similar operation is successively executed by User 3 who is a third signer to User N who is an N-th signer to thereby generate "Multisignature 1•2 . . . N".

As shown in FIG. 2, validity of "Multisignature 1•2 . . . N" is verified. A device for verifying the multisignature executes a verification process with respect to Document x and "Multisignature 1 . . . N" based on public keys 1, . . . , N at the time of the generation of the multisignature, and accepts or rejects the multisignature in accordance with verification results.

In the multisignature system, several additional functions have been proposed. Examples of a representative function includes message flexibility, order flexibility, and order verifiability.

The message flexibility refers to a property that a plurality of users can update or change a message while generating the multisignature during circulation of the message. For example, as shown in FIG. 3, User 1 whose order is first generates Signature 1 with respect to Document x. User 2 whose order is second updates or changes Document x1, obtains Document x2 as difference information, and then generates "Signature 1•2" utilizing Signature 1 with respect to Documents x1 and x2. "Signature 1•2" ensures that User 1 has approved Document x1, and User 2 has approved Documents x1, x2. Subsequently, the users to User N who is the N-th signer similarly successively execute the updating or the changing Document x1 and signature generation to obtain "Multisignature 1 . . . N".

The order flexibility refers to a property that signature order can be freely changed till a stage of signature generation.

The order verifiability refers to a property that the order of the signer can be verified in the verification process of the multisignature. When there is the order verifiability, a verifier can confirm that the second signer has approved the document, and the second signer has approved the signature process of the first signer with respect to the multisignature generated by N signers. It is to be noted that the multisignature system in the present specification comprises the message flexibility, the order flexibility and the order verifiability.

On the other hand, active and passive attack methods exist in the multisignature system. In the passive attack method, an attacker utilizes public information only, and forges the multisignature with respect to an arbitrary document. In the active attack method, the following conditions (i) to (iii) are satisfied in the process of the forging of the multisignature with respect to the arbitrary document utilizing the public information.

(i) The attacker can prepare own public key or a set of the public key and secret key based on another signer's public key, and participate in the multisignature system as a regular signer.

(ii) The attacker can receive signers' secret keys in collusion with some signers.

(iii) The attacker can ask an arbitrary regular signer to sign on the arbitrary document chosen by the attacker.

Moreover, in the active attack method, a signer who the attacker pretends to be, and a signer who colludes with the attacker will be referred to as illegal signers. A time when the signature output by the attacker is a forged signature indicates a time when at least one signer is not an illegal signer, and is not asked to generate the signature with respect to the document corresponding to the signature in a group of signers who are supposed to have participated in the signature.

Furthermore, in the active attack method, especially a method of setting own key using another signer's public key at the time of the generation of the key to thereby generate the multisignature without using any signer's secret key is known as adaptive insider attack.

This active attack method is an attack method more powerful than the passive attack method. Therefore, the constituting of a multisignature method which is safe even against the active attack method means that higher security can be assured.

With regard to this type of security, the multisignature system is classified into two systems. In a first system, difficulty in operation of discrete logarithm is regarded as a ground for the security, and the security is proved by concept of zero knowledge proof. Examples of a representative system include Ohta-Okamoto System, and Micali-Ohta-Reyzin System. The first system is characterized in that the size of the multisignature does not depend on the number of signers, and is equal to that of the signature by one signer, and costs of the signature verification process can be suppressed. However, since the grounds for the security are based on zero knowledge dialogue proof in the first system, efficiency of resolving is bad, and the system does not have any tight security. The tight security indicates that divergence between difficulty in operation for solving a certain problem and difficulty in operation for solving another problem is low.

In general, to indicate the security of the multisignature system, a problem to break a one-way property of a trapdoor one-way function is reduced to a problem to break the multisignature system. That is, when the multisignature system is broken, it is indicated that the one-way property of the trapdoor one-way function is broken, and the security of the multisignature system is proved.

In detail, it is indicated that the one-way property of the trapdoor one-way function is broken at a high probability, if the multisignature system is broken. In this case, difficulty in breaking the multisignature system is considered to be equal to that in breaking the one-way property of the trapdoor one-way function, represented by a discrete logarithm problem or an RSA problem. At this time, it can be said that the multisignature system has a tight security with respect to the one-way property of the trapdoor one-way function.

Conversely, it is said that the multisignature system does not have any tight security against the one-way property of the trapdoor one-way function if, even when the multisignature system is broken, the one-way property of the trapdoor one-way function is not broken only at a low probability.

Here, it is assumed that there are two systems whose security are based on a certain problem, one of the systems has a tight security with respect to the problem difficult to operate, and the other system does not have any tight security. In the system which does not have any tight security, to assure the security equal to that of the system having the tight security, a key having a larger size is used, and a problem occurs that operation cost and storage region are increased. The above-described first system corresponds to this.

On the other hand, in the classification of the multisignature system, the second system has the tight security, and therefore solves the problem of the first system. In detail, in the second system, the difficulty in operating prime factorization is regarded as the ground for the security. Representative examples include Mitomi-Miyaji system in which difficulty in operating the RSA problem is regarded as the ground for the security (S. Mitomi and A. Miyaji, "A General Model of Multisignature Schemes with Message Flexibility, Order Flexibility, and Order Verifiability", IEICE Transaction of fundamentals, 2001, E-84-A, pp. 2488 to 2499), and Kawauchi-Tada system (K. Kawauchi and M. Tada, "On the exact security of multisignature schemes based on RSA", The Eighth Australasian Conference Information Security and Privacy (ACISP 2003), Springer-Verlag, 2003, Lecture Notes in Computer Science 2727, pp. 336 to 349).

Here, in the system of Mitomi, et al., as shown in FIG. 4, i-th signer applies a hash function $H_i$ to a document x, and inputs exclusive OR of the obtained hash value and the previous signature $\sigma_{i-1}$ into an RSA signature function to thereby obtain an i-th signature $\sigma_i$.

In the system of Kawauchi, et al., as shown in FIG. 5, an i-th signer applies a first hash function Hi to a document x, previous signature $\sigma_{i-1}$, and random number $r_i$, and applies a second hash function $G_i$ to the obtained first hash value $w_i$ to obtain a second hash value. Next, exclusive OR of the second hash value, and the previous signature $\sigma_{i-1}$ and random number $r_i$ is operated to obtain an operation result $s_i$. Furthermore, this operation result $s_i$ and the first hash value $w_i$ are input into the RSA function to thereby obtain i-th signature $\sigma_i$.

In any case, unlike the first system based on zero knowledge dialogue proof, the second system has a tight security with respect to the difficulty in the operation of the RSA problem.

However, the security of the system of Mitomi, et al. is not sufficiently tight with respect to the difficulty in the operation of the RSA problem. Furthermore, in the system of Mitomi, et al., as signature order advances, the size of a signer's signature key needs to be increased. Therefore, there are a problem that the signature order of the signer is limited, a problem that an operation amount increases with an increase of the size of the signature key and the like. Furthermore, to eliminate the limitation of the order, there is a problem that each signer has to store and register keys having different sizes.

On the other hand, the security of the system of Kawauchi, et al. is sufficiently tight with respect to the difficulty in the operation of the RSA problem. However, in the system of Kawauchi, et al., in the same manner as in the system of Mitomi, et al., as the order advances, the size of the signer's signature key needs to be increased. Therefore, there are a problem that the order is limited, a problem that the operation amount increases with the increase of the size of the signature key and the like.

As described above, in the multisignature system, when the ground for the security is laid in the difficulty in the operation of the RSA problem as in the second system, the size of the key needs to be increased as the order advances. Therefore, there are a problem that the order is limited, a problem that the operation amount increases and the like.

BRIEF SUMMARY OF THE INVENTION

An object of the present invention is to provide a multisignature method, apparatus, program, and system which are capable of preventing an increase of a size of a key even when signature order advances in a case where a ground for security is laid in operation difficulty of inverse function operation of a trapdoor one-way function, represented by an RSA problem.

According to a first aspect of the present invention, as shown in FIG. 6, there is provided a multisignature method by a multisignature generation apparatus which generates i-th signature $\sigma_i$ with respect to document data x based on i−1-th signature $\sigma_{i-1}$ and document data x generated by another multisignature generation apparatus, the method comprising: dividing the i−1-th signature $\sigma_{i-1}$ into two, and obtaining second partial data $\sigma_{i-1,R}$ of $k_2$ bits and remaining first partial data $\sigma_{i-1,L}$; generating random number data $r_i$ of $k_0$ bits; applying a first random function $H_i'$ to the first partial data $\sigma_{i-1,L}$, the second partial data $\sigma_{i-1,R}$, the random number data $r_i$, and the document data x, and obtaining a first random function value $w_i$ of $k_1$ bits; applying a second random function $G_i$ to the first random function value $w_i$, and obtaining a second random function value $g_i$ of $(k_2+k_0)$ bits; executing binary operation of the second random function value $g_i$, the second partial data $\sigma_{i-1,R}$, and the random number data $r_i$, and obtaining an operation result $s_i$ of $(k_2+k_0)$ bits; applying a signature generation function to data of k bits based on the operation result $s_i$ and the first random function value $w_i$, and obtaining a signature value $z_i$ of k bits; concatenating the first partial data $\sigma_{i-1,L}$ to the signature value $z_i$, and generating i-th signature $\sigma_i$ ($=\sigma_{i-1,L}\|z_i$); and outputting this i-th signature $\sigma_i$.

According to a second aspect of the present invention, as shown in FIG. 7, there is provided a multisignature method by a multisignature generation apparatus which generates i-th signature $\sigma_i$ with respect to document data x based on i−1-th signature $\sigma_{i-1}$ and document data x generated by another multisignature generation apparatus, the method comprising: dividing the i−1-th signature $\sigma_{i-1}$ into three, and obtaining first partial data $\sigma_{i-1,L}$ of $k_1$ bits, third partial data $\sigma_{i-1,R}$ of $k_2$ bits, and remaining second partial data $\sigma_{i-1,M}$ generating random number data $r_i$ of $k_0$ bits; applying a first random function $H_i'$ to the second partial data $\sigma_{i-1,M}$, the third partial data $\sigma_{i-1,R}$, the random number data $r_i$, and the document data x, and obtaining a first random function value $w_i$ of $k_1$ bits; executing binary operation of the first random function value $w_i$ and the first partial data $\sigma_{i-1,L}$, and obtaining an operation result $w_i'$ of $k_1$ bits; applying a second random function $G_i$ to the operation result $w_i'$, and obtaining a second random function value $g_i$ of $(k_2+k_0)$ bits; executing binary operation of the second random function value $g_i$, the third partial data $\sigma_{i-1,R}$, and the random number data $r_i$, and obtaining an operation result $s_i$ of $(k_2+k_0)$ bits; applying a signature generation function to data of k bits based on the operation results $s_i$ and $w_i'$, and obtaining a signature value $z_i$ of k bits; concatenating the second partial data $\sigma_{i-1,M}$ to the signature value $z_i$, and generating i-th signature $\sigma_i$ ($=\sigma_{i-1,M}\|z_i$); and outputting this i-th signature $\sigma_i$.

According to the first and second aspects of the present invention, unlike the conventional systems shown in FIGS. 4 and 5, as shown in FIG. 6 or 7, when the i-th signature $\sigma_i$ is generated, the i−1-th signature $\sigma_{i-1}$ is divided into partial data $\sigma_{i-1,R}$ of $k_2$ bits and remaining partial data ($\sigma_{i-1,L}$ in the first aspect, $\sigma_{i-1,L}$, $\sigma_{i-1,M}$ in the second aspect). Here, the partial data ($\sigma_{i-1,L}$ in the first aspect, $\sigma_{i-1,L}$, $\sigma_{i-1,M}$ in the second aspect) exceeding $(k_0+k_2)$ bits, when the random number $r_i$ of $k_0$ bits is concatenated, is excluded from the input of the binary operation on the input side of the signature generation function. Accordingly, the size of the operation result $s_i$ of the binary operation is constant at $(k_0+k_2)$ bits, and, as a result, the input size of the signature generation function is set to be constant. Therefore, in a case where the ground for the security is laid in the difficulty in the inverse function operation of the one-way function represented by the RSA problem, even when the signature order advances, the increase of the size of the key can be inhibited.

DETAILED DESCRIPTION OF THE INVENTION

Embodiments of the present invention will be described hereinafter with reference to the drawings, but, first, outlines of the embodiments will be described. A first embodiment corresponds to a first invention shown in FIG. 6, and a second embodiment corresponds to a second invention shown in FIG. 7.

In the respective embodiments, in order to ensure the tight security of a multisignature system, a signature system represented by RSA signature is used as a signature generation function. The signature generation function used by an i−1-th signer is represented by $f_i^{-1}$. As f, an RSA function or a Rabin function described later can be used. The respective embodiments will be described hereinafter using the signature generation function whose input/output size is k bits. Modifications generated in a case where the RSA function or the Rabin function is used will be described with reference to FIGS. 13 and 14.

Two random functions $H_i'$, $G_i$ are assumed as hash functions such as SHA. Concrete examples of the random functions $H_i'$, $G_i$ are described in the following documents.

M. Bellare and P. Rogaway, "Optimal Asymmetric Encryption-How to encrypt with RSA" Advances in Cryptology-EUROCRYPT'94 LNCS, Springer-Verlag, 1995; the entire contents of which are incorporated herein by reference.

Subsequently, the respective embodiments will be described concretely.

FIRST EMBODIMENT

Figure 8:
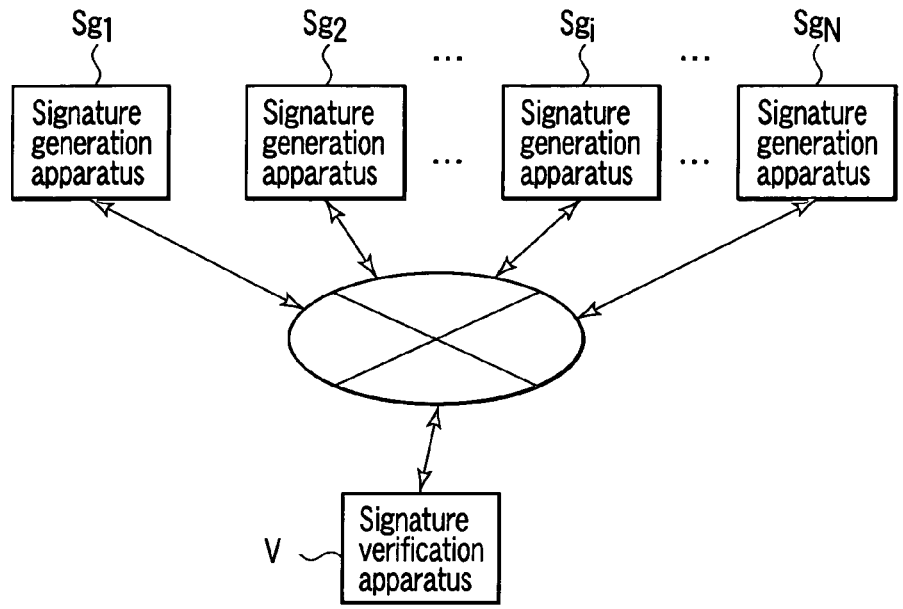
FIG. 8 is a schematic diagram showing a constitution of the multisignature system according to the first embodiment of the present invention.

FIG. 8 is a schematic diagram showing a constitution of a multisignature system according to a first embodiment of the present invention. In this multisignature system, N signature generation apparatuses $Sg_1$ to $Sg_N$ and one signature verification apparatus V are connected to one another via a network.

Here, the respective signature generation apparatuses $Sg_1$ to $Sg_N$ have the same hardware constitution. Here, the signature generation apparatus $Sg_i$ will be described as a representative example.

Figure 9:
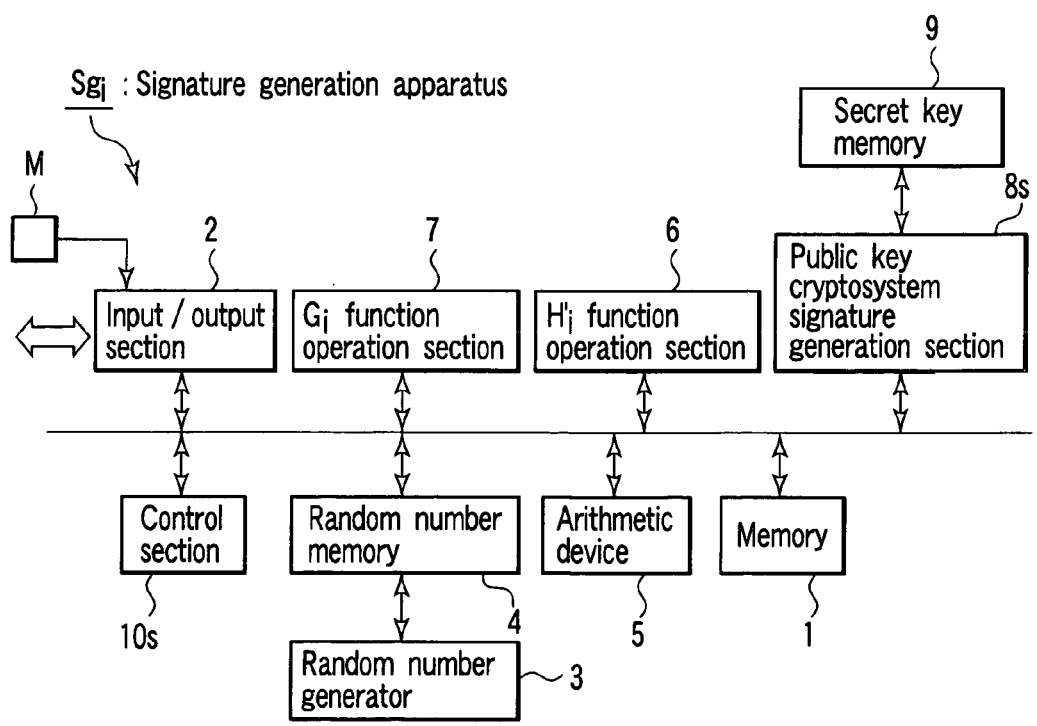
FIG. 9 is a schematic diagram showing a constitution of a signature generation apparatus in the embodiment.

As shown in FIG. 9, the signature generation apparatus $Sg_i$ comprises a memory 1, an input/output section 2, a random number generator 3, a random number memory 4, an arithmetic device 5, an $H_i'$ function operation section 6, a $G_i$ function operation section 7, a public key cryptosystem signature generation section 8s, a secret key memory 9, and a control section 10s. The respective elements 1 to 10 excluding the random number generator 3 and the secret key memory 9 are connected to one another via a bus. Affixes s of the respective sections 8s, 10s indicate signature generation processes. Similarly, affix v described later indicates a signature verification process.

Here, the memory 1 is a storage section readable/writable from the respective sections 2 to 10, and for example, a hard disk and a RAM are used. In the RAM, data are stored such as document data x, signature $\sigma_{i-1}$, first partial data $\sigma_{i-1,L}$, second partial data $\sigma_{i-1,R}$, first random function value $w_i$, second random function value $g_i$, operation result $s_i$, signature value $z_i$, and signature $\sigma_i$. For example, program of the apparatus is installed in the hard disk. If necessary, input data such as document data x and signature $\sigma_{i-1}$ or output data such as signature $\sigma_i$ is stored.

The document data x is obtained by concatenating identification information $ID_i$ of an i-th signer to document data x' including first to i−1-th signers' identifiers.

The signer's identifier $ID_i$ is important in knowing an acting order of a signer's public key when verifying the multisignature having order flexibility. Additionally, here the signer's identifier $ID_i$ and signature generation order i will be identified and described. In general, an order i of the identifier $ID_i$ does not have any relation with respect to a signature order i. Here, when the identifier $ID_i$ is associated with the signature order i, the identifier $ID_i$ and the signature order i are identified.

It is considered that the signer's identifier $ID_i$ is attached to the signature and transmitted. However, in the following embodiments, a property of message flexibility is utilized, and own identifier $ID_i$ is concatenated to the document data x' received from the signer having a previous signature order $ID_{i-1}$ to thereby obtain new document data x. The signature generation process is performed with respect to new document data to which its own identifier $ID_i$ has been attached, and an obtained signature value $\sigma_i$ and document data x are transmitted to the next signer having signature order i+1.

The input/output section 2 is an interface device between the signature generation apparatus $s_i$ and the outside. The input/output section 2 has a function of inputting the document data x and signature $\sigma_{i-1}$ to thereby write them into the memory 1 by a user's operation, and a function of outputting the signature $\sigma_i$ and document data x stored in the memory 1 by the signature generation process. The input/output section 2 also has a function of reading the program of the device from a computer-readable storage medium M beforehand to thereby install the program in the memory 1.

The random number generator 3 is a section for generating a random number $r_i$ necessary at the time of generation of the signature, and has a function of writing the generated random number $r_i$ in the random number memory 4.

The random number memory 4 holds the random number $r_i$ written from the random number generator 3 in such a manner that the number is readable from the arithmetic device 5.

The arithmetic device 5 is controlled by the respective sections 6 to 10s, and executes multilength arithmetic with respect to data in the memory 1. The arithmetic device has, for example, a function of executing binary operation of exclusive OR or the like, bit concatenating/dividing, bit comparison and the like, and a function of writing an execution result in the memory 1. As the binary operation, the exclusive OR will be described, but the present invention is not limited to this, and addition modulo exponentiation of 2 instead of the exclusive OR may be used. Additionally, in the addition modulo the exponentiation of 2, an appropriate process needs to be added for making possible the signature verification. Examples of the appropriate process include a process of shortening the output of the first random function $H_i'$ by one bit to thereby add 0 to the head, a process of adding a code to detect digit overflow at a signature verification time, a process of finding a correct value from a plurality of candidates and the like.

The $H_i'$ function operation section 6 has a function of applying the first random function $H_i'$ to the first partial data $\sigma_{i-1,L}$, second partial data $\sigma_{i-1,R}$, random number data $r_i$, and document data x in the memory 1, and a function of writing the obtained first random function value $w_i$ of $k_1$ bits in the memory 1.

Here, as the first random function $H_i'$, for example, a hash function such as SHA1 is used, and a random number of k1 bits is output with respect to an input having an arbitrary length. The first random function $H_i'$ is required to have one-way property and collision-intractable, an for example, values of 100 bits to 200 bits are used in values of k1. As to the first random function $H_i'$, a random function peculiar to the user may be used, and all or some users may use the same random function. In any case, the first random function $H_i'$ is associated with/represented by the signer's identifier $ID_i$ by the affix i. It is assumed that the first random function $H_i'$ is equal to the second random function $G_i$, and the function operation sections 6, 7 may be reduced to one only.

The $G_i$ function operation section 7 has a function of applying the second random function $G_i$ to the first random function value $w_i$ in the memory 1, and a function of writing the obtained second random function value $g_i$ of $(k_2+k_0)$ bits in the memory 1.

Here, it is assumed that as the second random function $G_i$, a hash function such as SHA1 is used, and the random number of $k_0+k_2$ bits is output with respect to an input having a length of k1 bits. It is assumed that a relation of $k=k_0+k_1+k_2$ is established among the respective bit lengths k, $k_0$, $k_1$, $k_2$. In this case, $k_0$ indicates the size of the random number generated by the signer, and, for example, values of 80 bits to 200 bits are used. $k_2$ indicates the size of a portion in which the corresponding bit is assumed as an input into its own signature generation function and the first random function $H_i'$ in signature information generated by the signer having the previous order in order to suppress the increase of the size of the multisignature, when the signer generates the multisignature. $k_2$ has a relation of $k_2=k-k_0-k_1$, and a value of, for example, 600 to 800 bits is used. The second random function $G_i$ is required to have the one-way property and collition-intractable. In $G_i$, a peculiar random function may be used for each user, and all or some users may use the same random function. In any case, the second random function $G_i$ is associated with and represented by the signer's identifier $ID_i$ by the affix i.

The public key cryptosystem signature generation section 8s has a function of applying the signature generation function to the operation result $s_i$ in the memory 1 and data of k ($=k_0+k_1+k_2$) based on the first random function value $w_i$ based on the secret key in the secret key memory 9 by the public key cryptosystem using a trapdoor one-way function f, and a function of writing the obtained signature value $z_i$ of k bits. In the trapdoor one-way function f, the public key cryptosystem represented by an RSA cryptosystem is used. When a length of an input/output value of the trapdoor one-way function f is represented by k, 1024 bits or 2048 bits are generally selected as the length. It is to be noted that as to the signature generation function, since the input/output size does not depend on the signature order, and it is therefore possible to use a usual signature generation function.

The secret key memory 9 is a memory in which the signer's (signature generation apparatus user's) secret key concerning the public key cryptosystem is stored, and is readable from the public key cryptosystem signature generation section 8s.

Figure 11:
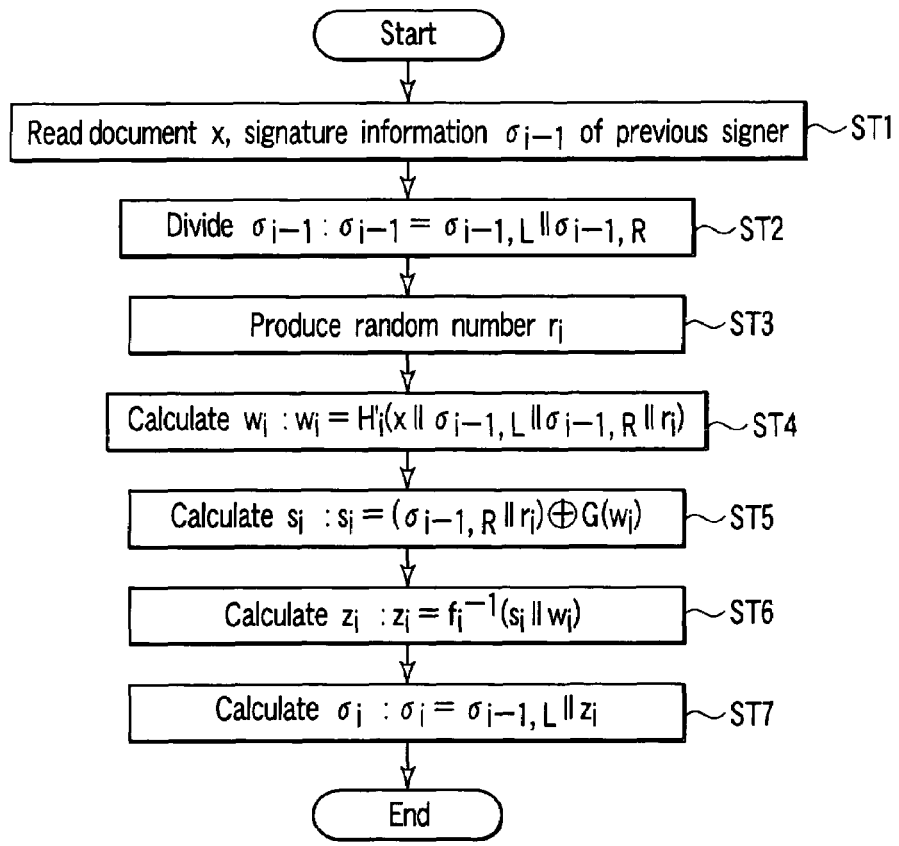
FIG. 11 is a flowchart showing an operation of the signature generation apparatus in the embodiment.

The control section 10s generates an i-th signature $\sigma_i$ with respect to document data x based on the input i−1-th signature $\sigma_{i-1}$ and document data x, and controls the respective sections 1 to 9 in such a manner as to output the obtained signature $\sigma_i$ and document data x. Concretely, as shown in FIG. 11, the control section 10s has a function of controlling the respective sections 1 to 10. This control section 10s is realized by installing a program for realizing the control function beforehand in a computer of the device from a computer-readable storage medium M via the input/output section 2. This also applies to another control section 10v described later.

Figure 10:
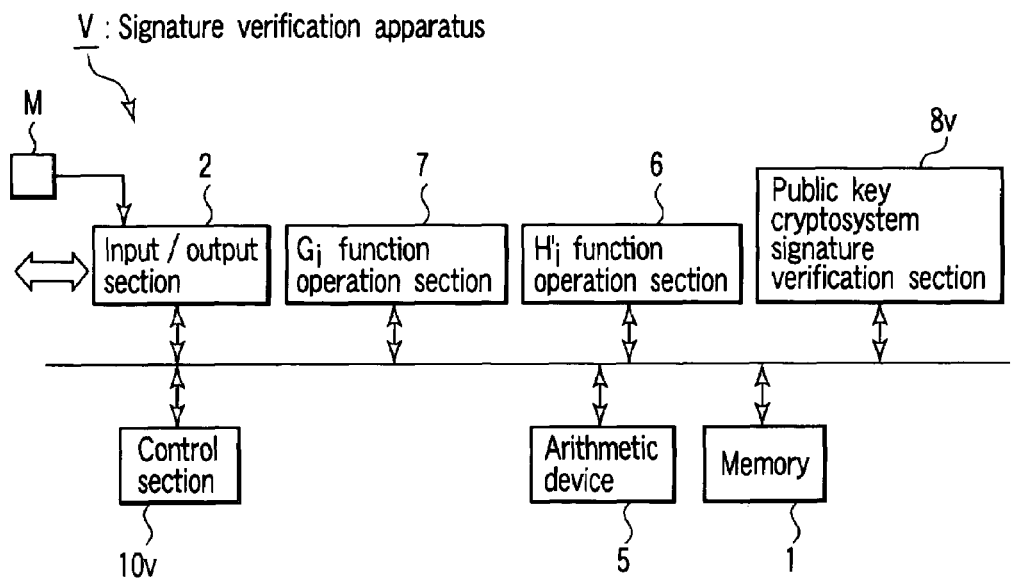
FIG. 10 is a schematic diagram showing a constitution of a signature verification apparatus in the embodiment.

On the other hand, as shown in FIG. 10, in a signature verification apparatus V, among the respective element 1 to 10s of the signature generation apparatus $Sg_i$, the random number generator 3, random number memory 4, and secret key memory 9 are omitted, a public key cryptosystem signature verification section 8v is disposed instead of the public key cryptosystem signature generation section 8s, and a control section 10v for a signature verification process is disposed instead of the control section 10s for the signature generation process. It is to be noted that as to the remaining elements 1, 2, 5 to 7 of the signature verification apparatus V, contents of input/output data are different from those of the signature generation apparatus $Sg_i$, but the elements have process functions similar to those of the elements 1, 2, 5 to 7 described in the signature generation apparatus.

Here, the public key cryptosystem signature verification section 8v has a function of applying an RSA signature verification function of key length k bits to the signature value $z_i$ in the memory 1 based on the public key in the memory 1 by the same public key cryptosystem as that for signature generation apparatuses $S_1$ to $S_N$, and a function of writing the obtained operation result $s_i$ of ($k_2+k_0$) bits and the first random function value $w_i$ of $k_1$ bits into the memory 1.

Figure 12:
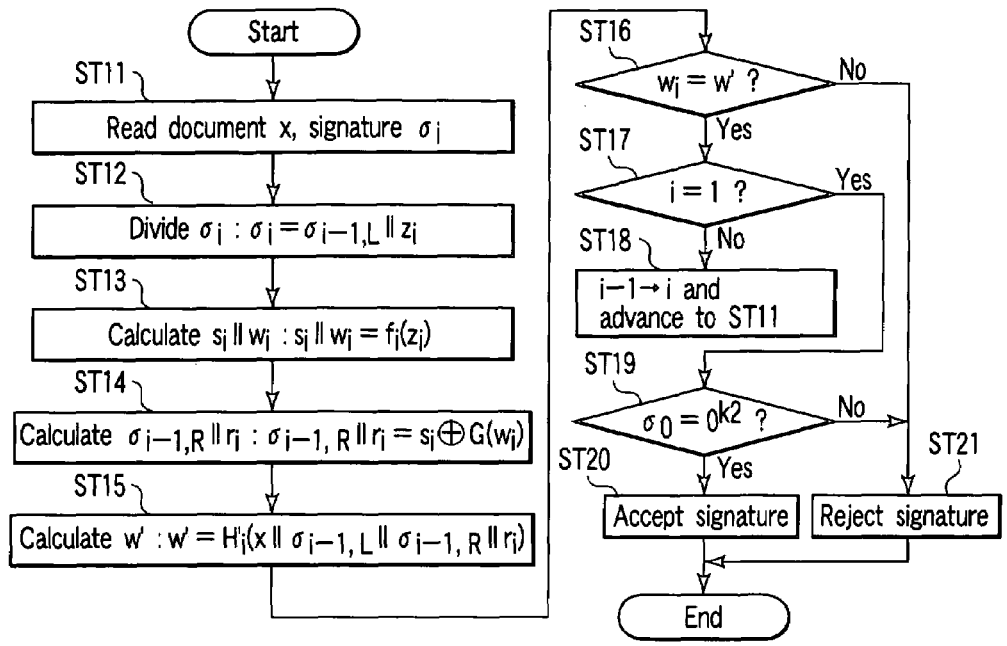
FIG. 12 is a flowchart showing an operation of the signature verification apparatus in the embodiment.

The control section 10v controls the respective sections 1 to 8v in such a manner as to verify validity of the signature $\sigma_i$ based on the input i-th signature $\sigma_i$ and document data x. Concretely, as shown in FIG. 12, the control section 10v has a function of controlling the respective sections 1 to 8v.

Next, an operation of the multisignature system constituted as described above will be described with reference to flowcharts of FIGS. 11 and 12.

(Signature Generation Process)

Figure 6:
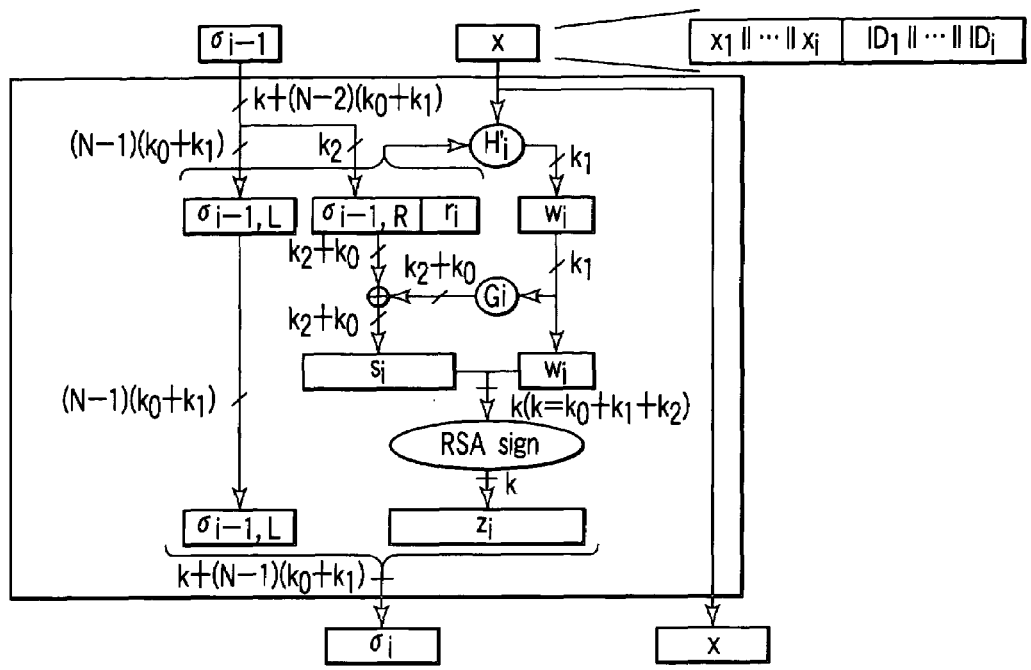
FIG. 6 is a schematic diagram showing the signature generation system by a multisignature system according to a first embodiment of the present invention.

The signer utilizes the signature generation apparatus $Sg_i$ in order to attach self signature to the document data x constituted by concatenating self identifier $ID_i$ to document data x' with respect to the signature $\sigma_{i-1}$ and document data x' received from the i−1-th signer. Here, the document data x' is $x'=x_1\|\ldots\|x_{i-1}\|ID_1\|\ldots ID_{i-1}$. Additionally, when the i-th signer modifies the document data x', and modified difference information $x_i$ is concatenated, the document data x' is $x'=x_1\|\ldots\|x_{i-1}\|x_i\|ID_1\|\ldots ID_{i-1}$. The document data x which is a signature object is $x=x'\|ID_i=x_1\|\ldots\|x_i\|ID_1\|\ldots\|ID_i$. In the signature generation apparatus $Sg_i$, as shown in FIGS. 6 and 11, the respective sections 1 to 9 operate by the control section 10s.

The first signer obtains the document x which is the signature object, and prepares information $0^k2$ in which $k_2$ 0s are concatenated as signature information $\sigma_0$ of the previous signer.

The input/output section 2 reads the i−1-th signature $\sigma_{i-1}$ and document data x of $\{k+(i-2)(k_0+k_1)\}$ bits (where $k=k_0+k_1+k_2$) by a signer's operation, and writes them into the memory 1 (ST1). Additionally, when the order is first, the input/output section 2 writes the information $0^k2$ in which $k_2$ 0s are concatenated as a signature initial value $\sigma_0$ in the memory 1.

The arithmetic device 5 divides the i−1-th signature $\sigma_{i-1}$ in the memory 1 into two, and writes obtained second partial data $\sigma_{i-1,R}$ of lower $k_2$ bits and first partial data $\sigma_{i-1,L}$ of remaining $(i-1)(k_0+k_1)$ bits into the memory 1 (ST2). It is to be noted that when the order is first, second partial data $\sigma_{i-1,R}$ is $\sigma_{i-1,R}=\sigma_0$, and any first partial data $\sigma_{i-1,L}$ does not exist.

The random number generator 3 generates random number data $r_i$ of $k_0$ bits, and writes this random number $r_i$ into the memory 1 (ST3).

The $H_i'$ function operation section 6 applies a first random function $H_i'$ to the first partial data $\sigma_{i-1,L}$, second partial data $\sigma_{i-1,R}$, random number data $r_i$, and document data x in the memory 1, and writes the obtained first random function value $w_i$ ($=H_i'(x\|\sigma_{i-1,L}\|\sigma_{i-1,R}\|r_i)$) of $k_1$ bits into the memory 1 (ST4).

The $G_i$ function operation section 7 applies the second random function $G_i$ to the first random function value $w_i$ in the memory 1, and writes the obtained second random function value $g_i$ ($=G_i(w_i)$) of ($k_2+k_0$) bits into the memory 1.

The arithmetic device 5 executes the exclusive OR of the second random function value $g_i$ in the memory 1, and concatenated data ($\sigma_{i-1,R}\|r_i$) of the second partial data $\sigma_{i-1,R}$ and the random number data $r_i$, and writes the obtained operation result $s_i$ of ($k_2+k_0$) bits into the memory 1 (ST5).

The public key cryptosystem signature generation section 8s applies the signature generation function to concatenated data ($s_i \| w_i$) of k (=$k_0+k_1+k_2$) bits of the operation result $s_i$ in the memory 1 and the first random function value $w_i$, based on the secret key in the secret key memory 9 by the public key cryptosystem using the trapdoor one-way function f, and writes the obtained signature value $z_i$ (=$f_i^{-1}(s_i \| w_i)$) into the memory 1 (ST6).

The input/output section 2 concatenates the first partial data $\sigma_{i-1,L}$ in the memory 1 to the signature value $z_i$, and outputs the obtained i-th signature $\sigma_i$ (=$\sigma_{i-1,L} \| z_i$) of {k+(i−1)($k_0+k_1$)} bits, and the document data x (ST7). Additionally, when the order is first, any first partial data $\sigma_{i-1,L}$ does not exist, and therefore a signature value $z_1$=signature $\sigma_1$ results.

It is to be noted that the above-described generation process of the i-th signature $\sigma_i$ may be performed after verifying the received i−1-th signature $\sigma_{i-1}$. This verification can be executed by a signature verification process described later.

(Signature Verification Process)

When the i-th signature $\sigma_i$ and document data x are input, a signature verifier utilizes a signature verification apparatus v in order to verify validity of the multiplied signature $\sigma_i$. When performing the signature verification process, the signature verification apparatus v reads each signer's public key into the public key cryptosystem signature verification section 8v from the input/output section 2, so that the signature verification process is possible.

In the signature verification apparatus v, as shown in FIG. 12, the input/output section 2 writes the document data x and i-th signature $\sigma_i$ which are verification objects into the memory 1 by a signature verifier's operation (ST11).

The arithmetic device 5 divides the i-th signature $\sigma_i$ in the memory 1 into two, and writes the obtained signature value $z_i$ of lower k bits and the first partial data $\sigma_{i-1,L}$ Of the remaining (i−1)($k_0+k_1$) bits into the memory 1 (ST12).

The public key cryptosystem signature verification section 8v applies a signature verification function to the signature value $z_i$ in the memory 1 based on the public key in the memory 1 by the public key cryptosystem ($f_i(z_i)=s_i \| w_i$), and writes the obtained operation result $s_i$ of upper ($k_2+k_0$) bits and the first random function value $w_i$ of lower $k_1$ bits into the memory 1 (ST13).

The $G_i$ function operation section 7 applies the second random function $G_i$ to the first random function value $w_i$ in the memory 1, and writes the obtained second random function value $g_i$ (=$G_i(w_i)$) of ($k_2+k_0$) bits into the memory 1.

The arithmetic device 5 executes the exclusive OR of the second random function value $g_i$ and the operation result $s_i$ in the memory 1, and obtains an operation result ($\sigma_{i-1,R} \| r_i$) of ($k_2+k_0$) bits (ST14).

The $H_i'$ function operation section 7 applies a first random function $H_i'$ to the first partial data $\sigma_{i-1,L}$, operation result ($\sigma_{i-1,R} \| r_i$), and document data x in the memory 1, and writes an obtained first random function value $w_i'$ (=$H_i'(x \| \sigma_{i-1,L} \| \sigma_{i-1,R} \| r_i)$) of $k_1$ bits into the memory 1 (ST15).

The control section 10v reads the first random function value $w_i$ of the step ST13 and the first random function value $w_i'$ of the step ST15 from the memory 1 to thereby mutually verify both the values (ST16). When the both agree with each other, it is judged that the i-th signature is valid.

When the i-th signature is valid, the arithmetic device 5 divides the operation result ($\sigma_{i-1,R} \| r_i$) in the memory 1 into the second partial data $\sigma_{i-1,R}$ of upper $k_2$ bits, and random number data $r_i$ of lower $k_0$ bits, and writes them into the memory 1.

Moreover, the arithmetic device 5 concatenates the first partial data $\sigma_{i-1,L}$ and the second partial data $\sigma_{i-1,R}$ in the memory 1 to restore the i−1-th signature $\sigma_{i-1}$(=$\sigma_{i-1,L} \| \sigma_{i-1,R}$).

The control section 10v updates this i−1-th signature $\sigma_{i-1}$ and the document data x as the i-th signature $\sigma_i$ and document data x to thereby update the memory 1.

After completing this update, the control section 10v judges whether or not i=1 (ST17). When i=1 does not result, the control section controls the respective sections 1 to 8v in such a manner as to execute the above-described steps ST11 to ST17 again. Additionally, before the control for the re-execution, the control section 10v deletes the identification information $ID_i$ of the signer whose order is i-th from the document data x, and replaces the obtained document data x' with the document data x.

On the other hand, when i=1 (ST17; YES), the control section 10v verifies whether or not the updated signature $\sigma_0$ agrees with a preset signature initial value $0^k2$ (ST19). When the both agree with each other, the control section accepts multiplied signature $\sigma_i$ (ST20), and ends the signature verification process.

Moreover, when the both disagree with each other in the step ST19 or ST16, the control section 10v rejects the signature (ST21), and ends the signature verification process.

(Roles of Random Number $r_i$ and Random Functions $H_i'$, $G_i$)

Here, roles of the random number $r_i$, first random function $H_i'$, and second random function $G_i$ in the above-described operation will be described.

The random number $r_i$ is concerned with enhancement of security, more strictly enhancement of resolving efficiency. As described above, in general, the security of the multisignature system is proved by the resolving.

In the security proof, it is indicated that the inverse function operation of the trapdoor one-way function represented by the RSA problem can be executed unless the multisignature system is safe. In detail, a forger who breaks the multisignature system is assumed, the forger is allowed to operate in simulation environment, information is obtained from the forger, and algorithm is constituted in such a manner as to break the RSA problem.

As to the role of the random number $r_i$ in the proof, intuitively by simulation, when the forger outputs a signature request with respect to document incapable of appropriately responding to the signature request, the signature request can be appropriately answered by a new random number. A random number in a signature system PSS also plays a similar role. At this time, the random number needs to be selected truly at random in order to ensure that the random number is selected by the forger at random. When the selected random number is the same as the previously selected random number, and a response to the signature request cannot be appropriately simulated, security proof fails. Therefore, the random number selected at random needs to be different from the previously selected number, and the size of the random number needs to be sufficiently large. In general, as the size $k_0$ of the random number $r_i$, a value of 80 to 160 bits is sufficiently selected.

The roles of the first and second random functions $H_i'$, $G_i$ are to ensure the validity of the signature in the signature verification. That is, outputs $w_i'$, $G(w_i)$ of the first and second random functions $H_i'$, $G_i$ are used in the steps ST16 and ST19 for judging whether or not to accept the signature.

Furthermore, second roles of the first and second random functions $H_i'$, $G_i$ are to appropriately realize simulation of environment for allowing the forger to operate in the security proof. It is to be noted that the security proof is performed on the assumption of random oracle. A random oracle model refers to a situation in which the random function is idealistic, the same output is obtained from the same input, but the output corresponding to the input cannot be estimated as one bit until the output is operated from the input.

(Reason Why Multisignature System is Safe)

An intuitive reason why the multisignature system of the present embodiment is safe will be described as follows. When the multisignature system is safe, intuitively any attacker cannot forge the signature against any arbitrary document. At this time, when the attacker forges the multisignature by N signers, the attacker is permitted to collude with N−1 signers at maximum excluding at least one signer and obtain secret keys of N−1 signers. Now a case where the attacker generates the forged signature without breaking the one-way property of a trapdoor one-way function $f_i$ for use as the signature generation function of at least one certain signer is considered.

A best attack procedure is to first determine a signature candidate $z_i'$, and next determine an appropriate document x. When the attacker determines $z_i'$, the one-way function $f_i$ is exerted in a calculatable direction, and $s_i \| w_i = f_i(z_i')$ can be obtained, and subsequently it is possible to operate $\sigma_{i-1}$, $\sigma_{i-2}, \ldots, \sigma_1, \sigma_0$ following a signature verification procedure.

However, from properties of the first and second random functions $H_i'$, $G_i$, and since the one-way function $f_i$ has one-to-one correspondence, the following situations (a) and (b) occur only accidentally.

(a) Situation in which $w_i$ corresponding to each signer's signature information with respect to $z_i$ selected at random agrees with a value obtained by inputting $x, \sigma_{i-1} \| r_i$ into the first random function $H_i'$.

(b) Situation in which the signature $\sigma_0$ obtained with respect to the random $z_i$ agrees with the initial value data $0^k 2$.

Therefore, it is difficult to forge the signature.

(Security Against Active Attack)

An attacker who performs an active attack with respect to the multisignature of the present embodiment is considered. The attacker makes a signature request with respect to own selected document to a regular signer, receives the corresponding signature, and attacks the multisignature of the first embodiment based on the obtained information. The obtained information is obtained by verifying the received signature $\sigma_i = \sigma_{i-1,L} \| z_i'$, and includes the following (1) to (3).

(1) When the random number $r_i$ is selected with respect to the document x and signature information $\sigma_{i-1}$ of the previous signer, and concatenated data $x \| \sigma_{i-1,L} \| \sigma_{i-1,R} \| r_i$ of the document, signature information, and random number is input into the first random function $H_i'$, $w_i$ is output.

(2) The exclusive OR of $G_i(w_i)$ obtained by inputting $w_i$ into the second random function $G_i$, and $\sigma_{i-1,R} \| r_i$ is equal to $s_i$.

(3) The inverse function operation $f^{-1}(s_i \| w_i)$ of the trapdoor one-way function is equal to $z_i'$.

Whether or not the forging of the signature by the active attack is successful depends on whether or not the inverse function operation $z_i' = f^{-1}(s_i \| w_i)$ of the trapdoor one-way function is executable with respect to data $s_i \| w_i$.

Now, it is assumed that, as a result of the active attack, when the own selected $z_i'$ is input into the trapdoor one-way function, data $s_i \| w_i$ is operated, and a large number of sets $(s_i \| w_i, z_i' = f^{-1}(s_i \| w_i))$ are held.

In general, even when the document x, $\sigma_{i-1}$, random number $r_i$ are arbitrarily selected, from the properties of the first and second random functions $H_i'$, $G_i$, the operated data $s_i \| w_i$ does not agree with data $s \| w$ in the held list.

Therefore, in the same manner as in the active attack, a best attack procedure is to first determine the signature candidate $z_i'$, and next determine the appropriate document x. Here, especially an actively obtained set is an object in a held set $(s \| w, z)$. It is assumed that $\sigma_{i-1,L}'$ and x', different from $\sigma_{i-1,L}$ and document x output as a signature request, are added to $\sigma_{i-1,R} \| r$ operated by the exclusive OR of a value $G(w)$ obtained from the data w of this set and data s to thereby obtain concatenated data $(x' \| \sigma_{i-1,L}' \| \sigma_{i-1,R} \| r)$. However, from the property of the first random function $H_i'$, it is difficult to find $\sigma_{i-1,L}'$ and x' such that the output of the first random function $H_i'$ is equal to w, when the concatenated data is input into the first random function $H_i'$. Therefore, the attack is impossible.

It is to be noted that a reason why $\sigma_{i-1,L}'$ and x', different from $\sigma_{i-1,L}$ and x output in the signature request, are selected is as follows. That is, when $\sigma_{i-1,L}$ and x output in the signature request are used, the value obtained by inputting $\sigma_{i-1,L}$ and x into the first random function in $\sigma_{i-1,R} \| r$ agrees with w, but the signature cannot be forged. If signature $\sigma_{i-1,L} \| z$ is output with respect to x and $\sigma_{i-1,L} \| \sigma_{i-1,R}$, the signature is the same as that generated by a regular signer by the signature request which is the active attack. Therefore, the forging of the signature, that is, the outputting of the new signature to the document which is not approved by the regular signer is not successful.

Therefore, it is difficult to output the forged signature using the information obtained by the active attack even in the multisignature system of the present embodiment, and the security of the present embodiment can be proved from the above-described reason. Argument similar to the argument of the security can also apply to the security of a second embodiment described later.

As described above, according to the present embodiment, as shown in FIG. 6, to generate the i-th signature $\sigma_i$, the i−1-th signature $\sigma_{i-1}$ is divided, and the portion $(\sigma_{i-1,L})$ exceeding $(k_0 + k_2)$ bits when concatenating the random number $r_i$ of $k_0$ bits is excluded from the input of the binary operation on the input side of the signature generation function $f_i^{-1}$. Accordingly, the size of the operation result $s_i$ of the binary operation is set to be constant at $(k_0 + k_2)$ bits, and, as a result, the input size (k bits) of the signature generation function is set to be constant. Therefore, in a case where the ground for security is laid in the difficulty in the inverse function operation of the trapdoor one-way function, even when the signature order advances, the increase of the size of the key can be inhibited.

In detail, the signer divides the signature information of the previous signer into two or more portions. In the first portion, the corresponding bit is input into the signature generation function. After the corresponding bit is input into the first random function $H_i'$, the remaining portion is attached to the output of the signature generation function, and output as the signature of the signer. By this division, the length of the input into the signature generation function is set to be constant without depending on the signature order, and therefore the size of each signer's key can be set to be constant without depending on the signature order or the total number of signers.

Figure 1A:
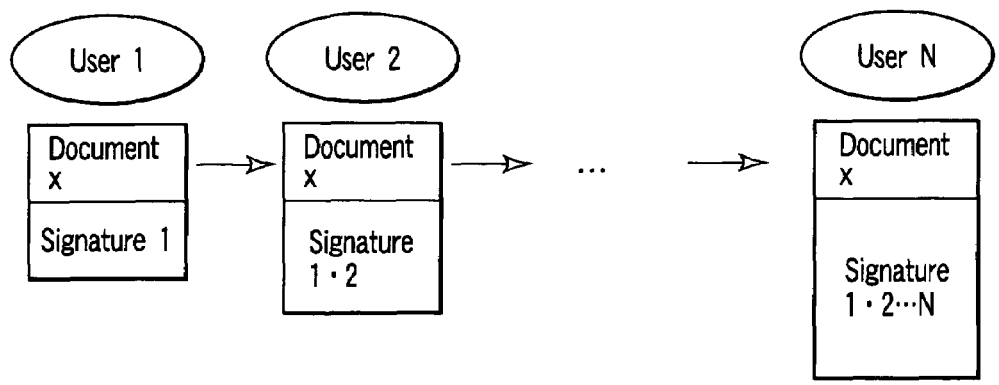
FIG. 1A is a schematic diagram showing outline of a general multisignature system.
Figure 1B:
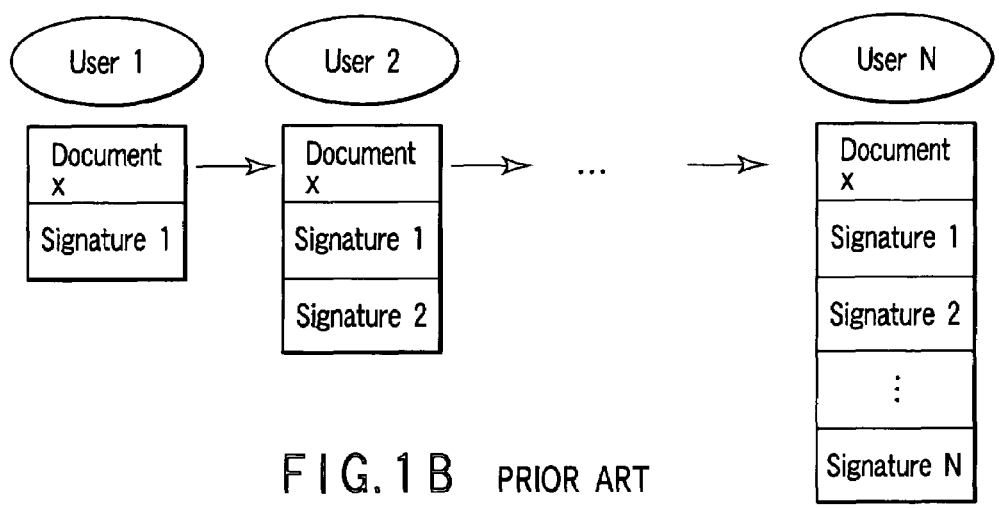
FIG. 1B is a schematic diagram showing the outline of a general concatenating signature system.
Figure 2:
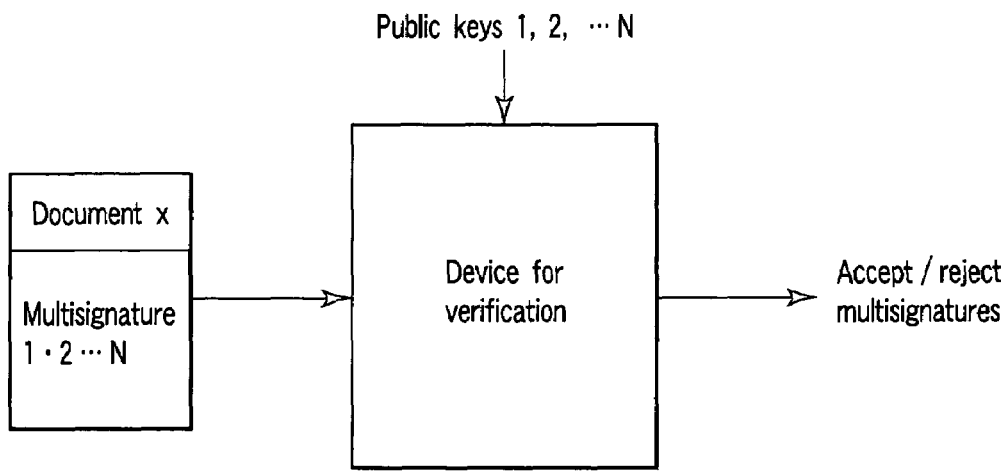
FIG. 2 is a schematic diagram showing the outline of a verification apparatus of the general multisignature system.
Figure 3:
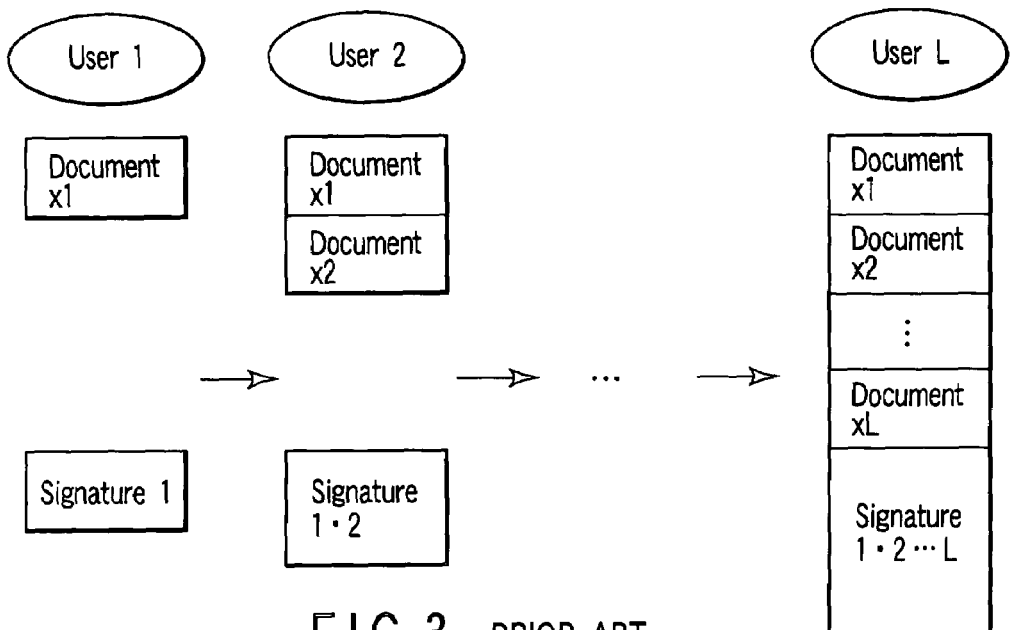
FIG. 3 is a schematic diagram showing the outline of message flexibility of the general multisignature system.
Figure 4:
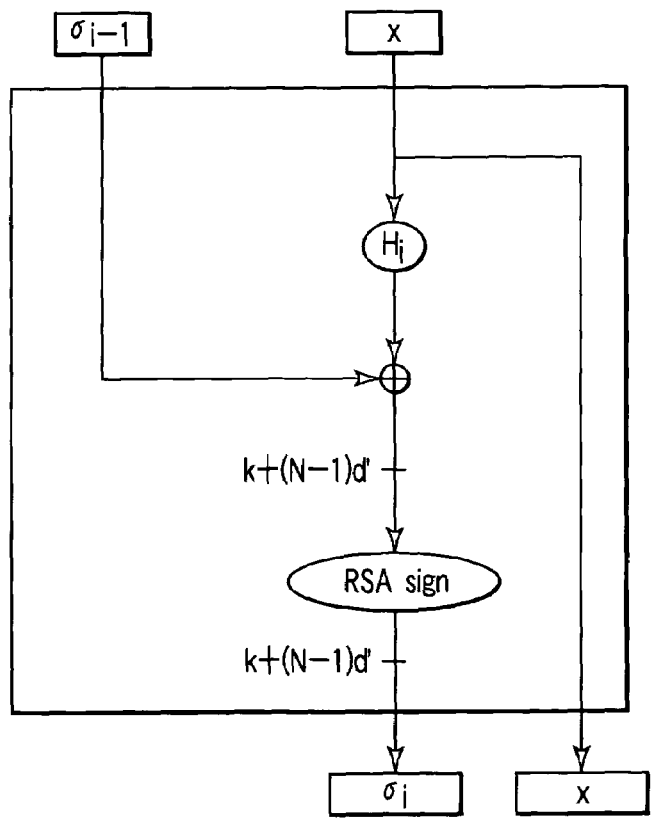
FIG. 4 is a schematic diagram showing one example of a signature generation system in a conventional multisignature method.
Figure 5:
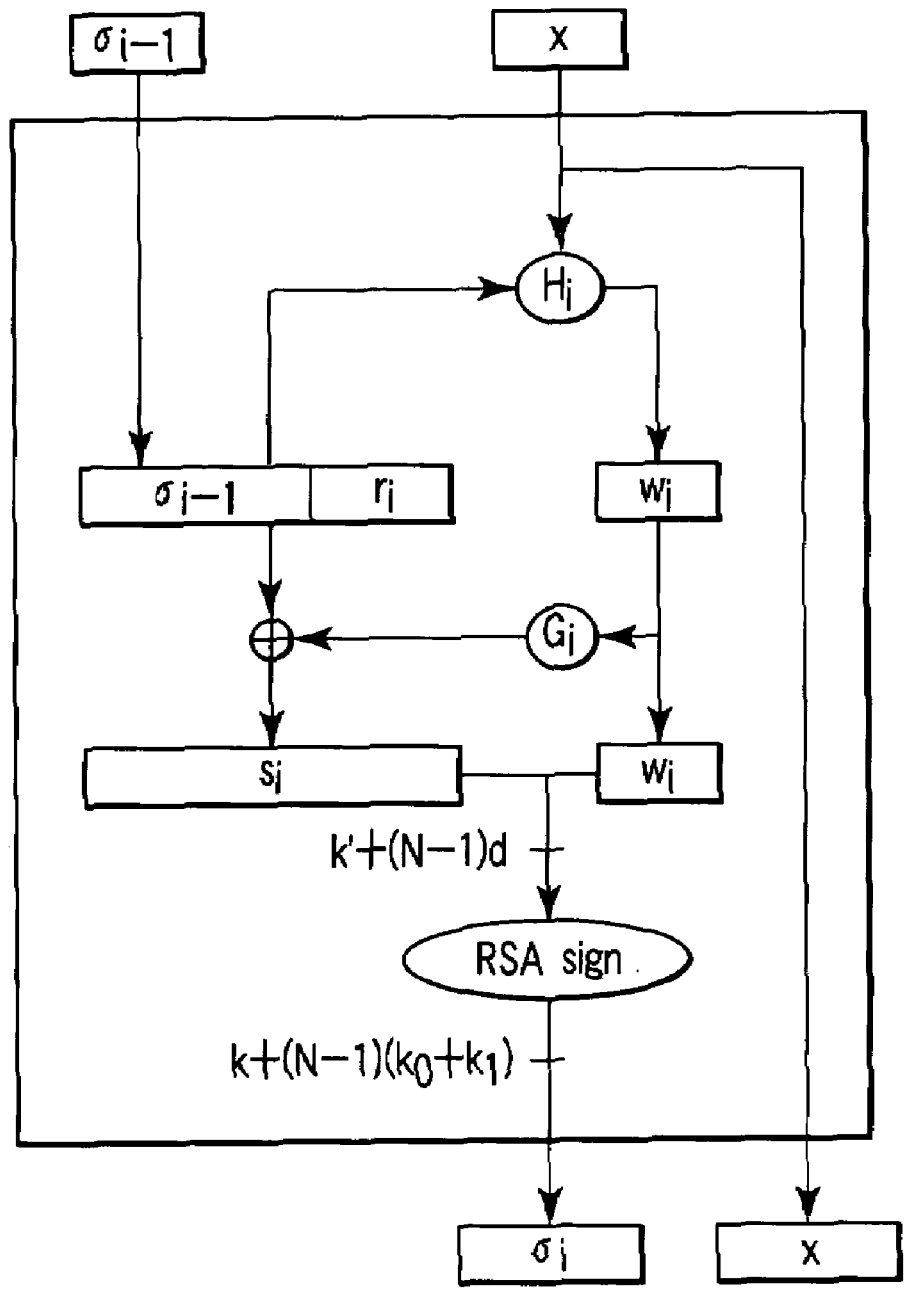
FIG. 5 is a schematic diagram showing one example of the signature generation system in the conventional multisignature method.

In more detail, in the present embodiment, unlike the method shown in FIG. 5, second partial data $(\sigma_{i-1,R})$ of lower k2 bits in the i−1-th signature $\sigma_{i-1}$ is input into a signature generation function $f_i^{-1}$, and the remaining portion $(\sigma_{i-1,L})$ is attached to the signature value $z_i$ without being input into the signature generation function. Accordingly, while keeping the tight security, the input size of the signature generation function used by each signer, that is, the size of the secret key can be set to be constant without depending on the signature order or the total number of signers.

Therefore, when the present method is mounted, the signature order can be freely selected without being limited by the input size of the signature generation function, and there is an order flexibility. Furthermore, unlike the existing technique, in the present method, the input size of the signature generation function is constant irrespective of the signature order. Therefore, a problem that the operation amount increases as the signature order advances can be solved. The increase of the operation amount is suppressed, and additionally the order flexibility and order verifiability can be practically realized.

It is to be noted that the present embodiment may be modified as follows.

For example, in the signature generation process, the information $0^{k}2$ in which $k_2$ 0s are concatenated has been used as the signature initial value $\sigma_0$, but the present invention is not limited to this, and may be modified in such a manner as to use a fixed value having a size of $k_2$ bits or more.

In the above-described embodiment, the general signature generation function has been described, but when an RSA function or a Rabin function is used as a concrete signature generation function, the mounting or the like is restricted. In an RSA or Rabin signature system, even as the value of k bits, a value larger than the modulo value cannot be input. Additionally, a technique for inputting the value larger than the modulo value is known, and it is possible to constitute a modification shown, for example, in FIG. 13 or 14.

Figure 13:
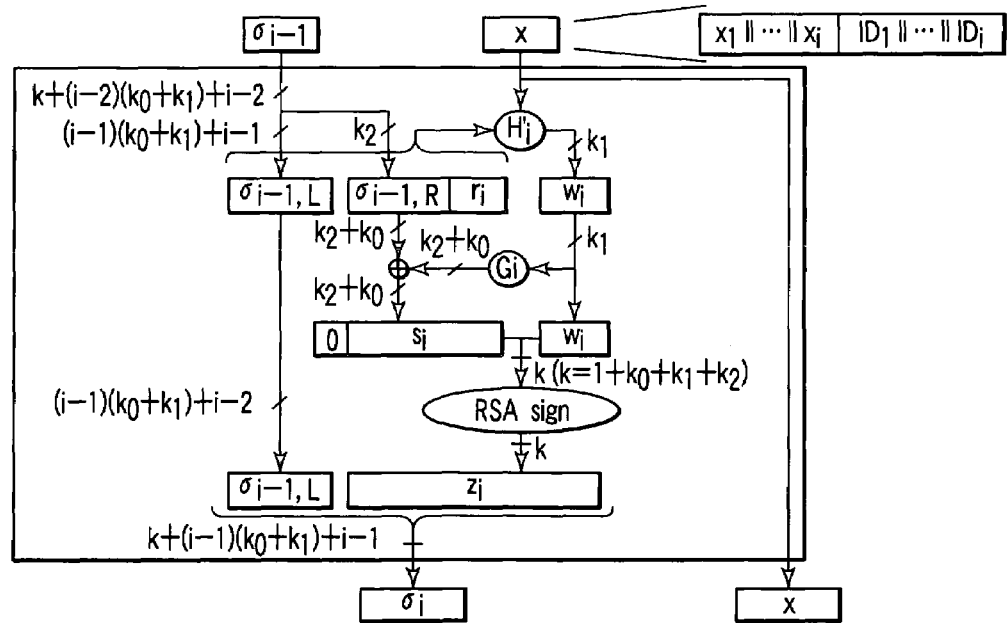
FIG. 13 is a schematic diagram showing a modification in the embodiment.

In the method of FIG. 13, in step ST1 of FIG. 11 showing a process procedure of the present embodiment, the i-1-th $\sigma_{i-1}$ of $k+(i-2)(k_0+k_1)+i-2$ bits is read, and divided into a second portion $\sigma_{i-1,R}$ of $k_2$ bits and a first portion $\sigma_{i-1,L}$ of $(i-1)(k_0+k_1)+i-1$ bits in step ST2. Thereafter, in step ST6, $z_i$ is operated by $f_i^{-1}(0\|s_i\|w_i)$ with respect to data $0\|s_i\|w_i$ of $k=1+k_0+k_1+k_2$ bits obtained by concatenating 0 to the head of the information in which $s_i$ is concatenated to $w_i$. Finally, in step ST7, the first portion $\sigma_{i-1,L}$ of $(i-1)(k_0+k_1)+i-1$ bits is concatenated to $z_i$ of k bits, and the i-th signature $\sigma_i$ of the value of $k+(i-1)(k_0+k_1)+i-1$ bits is operated. In the signature verification process in this modification, after exerting the public key of the RSA or Rabin signature with respect to the signature value $z_i$ in the step ST13, it is checked whether or not the head bit turns to 0. As a result of the check, when the head bit is 0, $k_0+k_2$ bits from the second bit are $s_i$, and the lower $k_1$ bits are $w_i$ in the data obtained by exerting the public key, and the signature verification process is performed. On the other hand, as a result of the check, when the head bit is not 0, the signature may be rejected.

Figure 14:
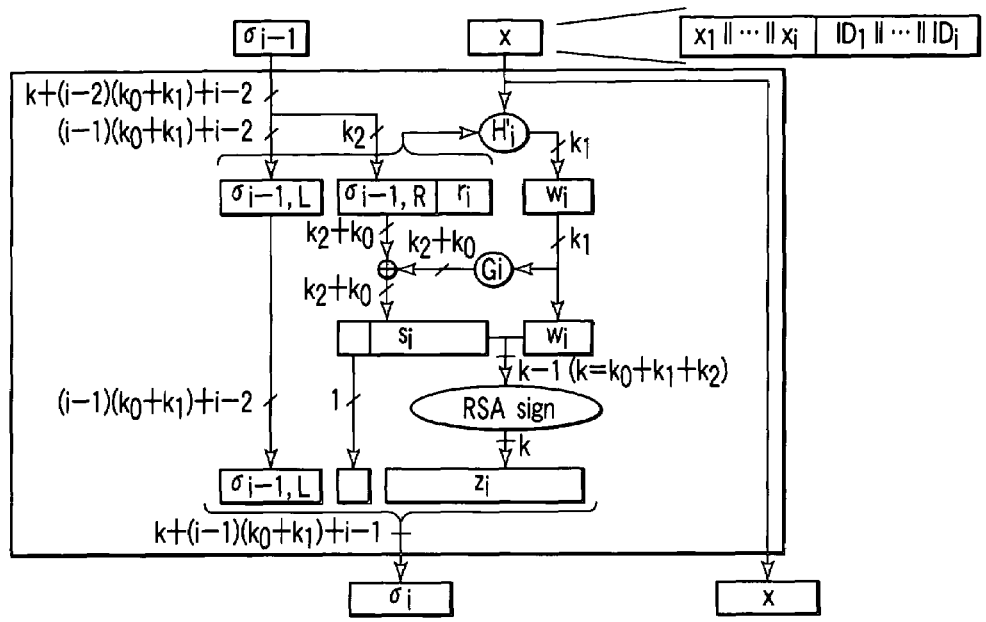
FIG. 14 is a schematic diagram showing another modification in the embodiment.

In the method of FIG. 14, in step ST1 of FIG. 11 showing the process procedure of the present embodiment, the i-1-th $\sigma_{i-1}$ of $k+(i-2)(k_0+k_1)+i-2$ bits is read, and divided into a second portion $\sigma_{i-1,R}$ of $k_2$ bits and a first portion $\sigma_{i-1,L}$ of $(i-1)(k_0+k_1)+i-2$ bits in step ST2. Furthermore, in step ST6, the data is divided into $s'_i\|w_i$ of head bit $s_i1$ of data of $k=1+k_0+k_1+k_2$ bits obtained by concatenating $s_i$ to $w_i$ and remaining k-1 bits, and $z_i$ is operated by $f_i^{-1}(s'_i\|w_i)$. Finally, in step ST7, the first portion $\sigma_{i-1,L}$ of $(i-1)(k_0+k_1)+i-2$ bits is concatenated to the head bit $s11$ of the data obtained by concatenating $s_i$ to $w_i$, and $z_i$ of k bits, and then the i-th signature $\sigma_i$ of the value of $\sigma_{i-1,L}\|s_i\|z_i$ of $k+(i-1)(k_0+k_1)+i-1$ bits is operated.

In the step ST6, a case where the concatenated data of the operation result $s_i$ and the first random function value $w_i$ is input into the signature generation function, but the present invention is not limited to this, and may be modified in such a manner as to input another data generated by the operation result $s_i$ and $w_i$ into the signature generation function. For example, a modification is considered in which $s_i$ is changed to $s'_i$ using a third random function G', the operation result of the exclusive OR of $w'_i$ and $G'(s_i)$ is $w''_i$, and data $(s'_i\|w''_i)$ in which these data $s'_i$, $w''_i$ are concatenated is input into the signature generation function.

SECOND EMBODIMENT

Next, a multisignature system according to a second embodiment of the present invention will be described with reference to FIGS. 8 to 10.

Figure 7:
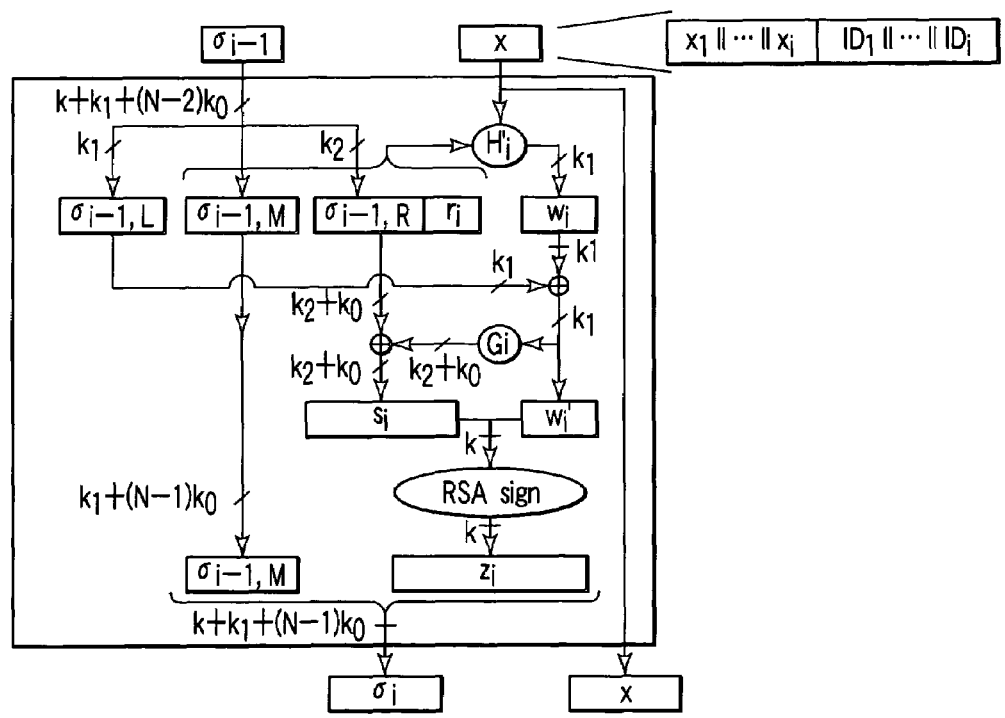
FIG. 7 is a schematic diagram showing the signature generation system by the multisignature system according to a second embodiment of the present invention.
Figure 15:
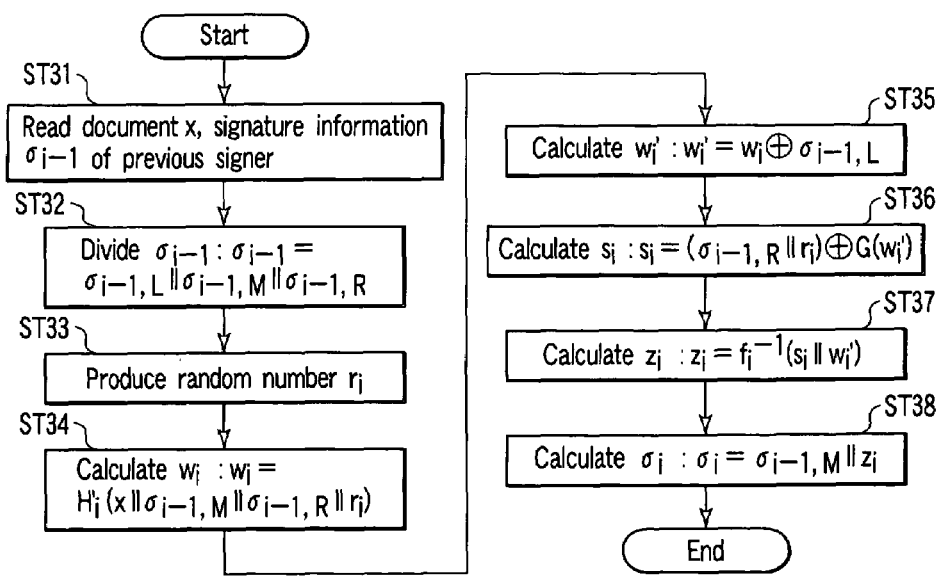
FIG. 15 is a flowchart showing an operation of the signature generation apparatus in the second embodiment of the present invention.
Figure 16:
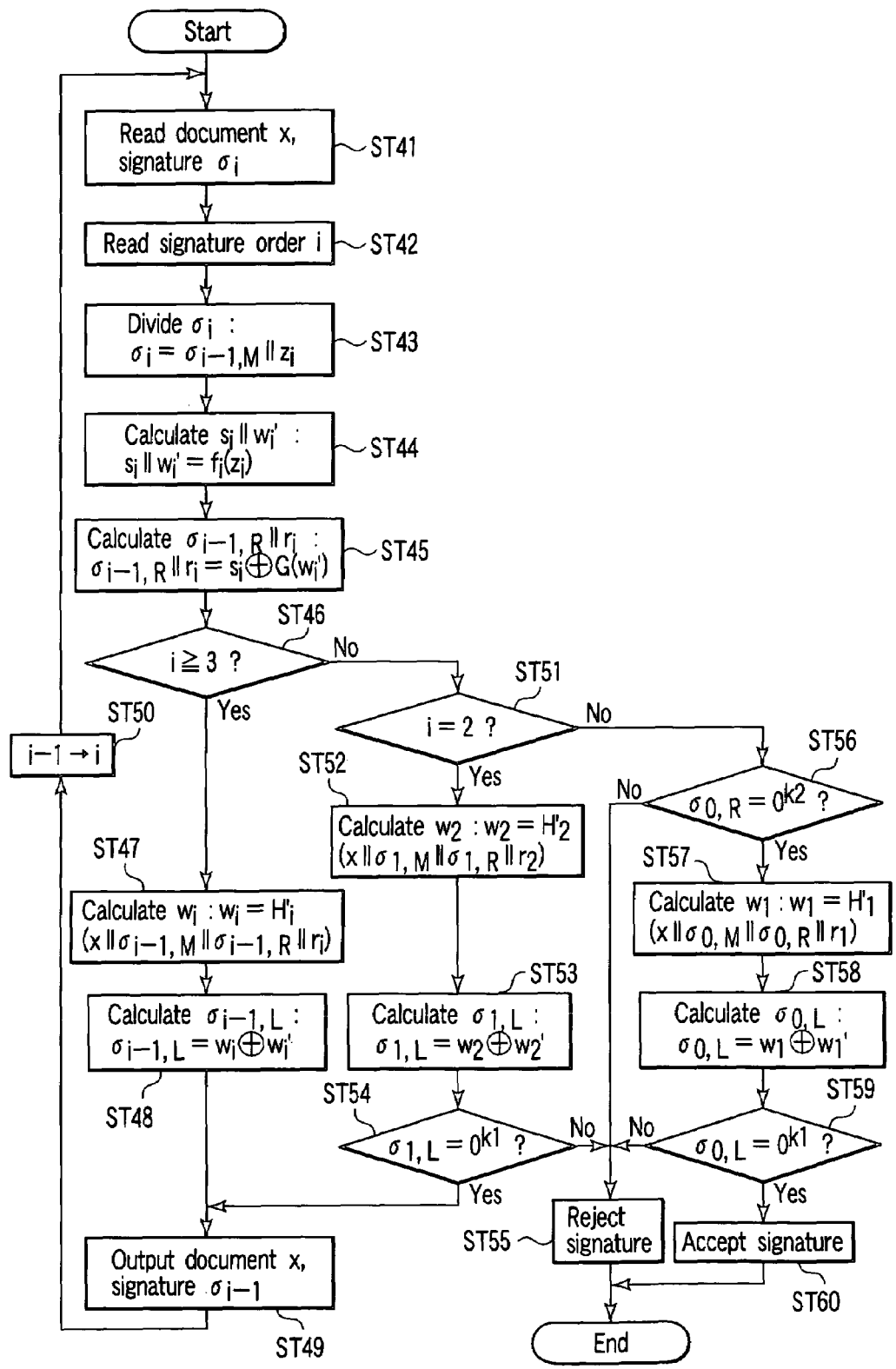
FIG. 16 is a flowchart showing an operation of the signature verification apparatus in the embodiment.

That is, in the present embodiment, a hardware constitution is similar to that of the first embodiment, but, unlike the first embodiment, a system shown in FIG. 7 is executed instead of the system shown in FIG. 6. Accordingly, a control section $10s$ of a signature generation apparatus $Sg_i$ controls sections 1 to 9 as shown in FIG. 15, and a control section $10v$ of a signature verification apparatus v controls the respective sections 1 to $8v$ as shown in FIG. 16.

Next, an operation of a multisignature system constituted as described above will be described with reference to flowcharts of FIGS. 15 and 16.

(Signature Generation Process)

A signer utilizes the signature generation apparatus $Sg_i$ in order to attach self signature to document data x constituted by concatenating self identifier $ID_i$ to document data x' with respect to the signature $\sigma_{i-1}$ and document data x' received from the i-1-th signer. Here, the document data $x'=x_1\| \ldots \|x_{i-1}\|ID_1\| \ldots ID_{i-1}$. Additionally, when the i-th signer modifies the document data x', and modified difference information $x_i$ is concatenated, the document data $x'=x_1\| \ldots \|x_{i-1}\|x_i\|ID_1\| \ldots ID_{i-1}$. The document data which is a signature object is $x=x'\|ID_i=x_1\| \ldots \|x_i\|ID_1\| \ldots \|ID_i$. In the signature generation apparatus, as shown in FIGS. 7 and 15, the respective sections 1 to 9 operate by the control section $10s$.

A signer whose order is first obtains document x to be signed, and prepares information $0^{2k}1^{+k}2$ in which $2k_1+k_2$ 0s are concatenated as signature information $\sigma_0$ of the previous signer.

The input/output section 2 reads the i-1-th signature $\sigma_{i-1}$ and document data x of $\{k+k_1+(i-2)k_0)\}$ bits (where $k=k_0+k_1+k_2$) by a signer's operation, and writes them into the memory 1 (ST31). Additionally, when the order is first, the input/output section 2 writes the information $0^{2k}1^{+k}2$ in which $2k_1+k_2$ 0s are concatenated as a signature initial value $\sigma_0$ into the memory 1.

The arithmetic device 5 divides the i-1-th signature $\sigma_{i-1}$ in the memory 1 into three, and writes obtained first partial data $\sigma_{i-1,L}$ of upper $k_1$ bits, third partial data $\sigma_{i-1,R}$ of lower $k_2$ bits, and second partial data $\sigma_{i-1,M}$ of remaining $\{k_1+(i-1)k_0\}$ bits into the memory 1 (ST32).

The random number generator 3 generates random number data $r_i$ of $k_0$ bits, and writes this random number $r_i$ into the memory 1 (ST33).

The $H_i'$ function operation section 6 applies a first random function $H_i'$ to the second partial data $\sigma_{i-1,M}$, third partial data $\sigma_{i-1,R}$, random number data $r_i$, and document data x in the memory 1, and writes the obtained first random function value $w_i$ ($=H_i'(x\|\sigma_{i-1,M}\|\sigma_{i-1,R}\|r_i)$) of $k_1$ bits into the memory 1 (ST34).

The arithmetic device 5 executes the exclusive OR of the first random function value $w_i$ and the first partial data $\sigma_{i-1,L}$ in the memory 1, and writes the obtained operation result $w'_i$ of $k_1$ bits into the memory 1 (ST35).

The $G_i$ function operation section 7 applies the second random function $G_i$ to the operation result $w'_i$ in the memory 1, and writes the obtained second random function value $g_i$ ($=G_i(w'_i)$) of $(k_2+k_0)$ bits into the memory 1.

The arithmetic device 5 executes the exclusive OR of the second random function value $g_i$ in the memory 1, and concatenated data $(\sigma_{i-1,R}\|r_i)$ of the third partial data $\sigma_{i-1,R}$ and the random number data $r_i$, and writes the obtained operation result $s_i$ of $(k_2+k_0)$ bits into the memory 1 (ST36).

The public key cryptosystem signature generation section $8s$ applies a signature generation function $f_i^{-1}$ of a key length $k$ ($=k_0+k_1+k_2$) bits to concatenated data $(s_i \| w_i')$ of the operation results $s_i$ and $w_i$ in the memory 1 based on the secret key in the secret key memory 9 by the public key cryptosystem using the trapdoor one-way function f, and writes the obtained signature value $z_i$ ($=f_i^{-1}(s_i\|w_i')$) into the memory 1 (ST37).

The input/output section 2 concatenates the second partial data $\sigma_{i-1,M}$ in the memory 1 to the signature value $z_i$, and outputs the obtained i-th signature $\sigma_i$ ($=\sigma_{i-1,M}\|z_i$) of $\{k+k_1+(i-1)k_0\}$ bits, and the document data x (ST38).

It is to be noted that the above-described generation process of the i-th signature $\sigma_i$ may be performed after verifying the received i−1-th signature $\sigma_{i-1}$. This verification can be executed by a signature verification process described later.

(Signature Verification Process)

When the i-th signature $\sigma_i$ and document data x are input, a signature verifier utilizes a signature verification apparatus v in order to verify validity of the multiplied signature $\sigma_i$. When performing the signature verification process, the signature verification apparatus v reads each signer's public key into the public key cryptosystem signature verification section $8v$ from the input/output section 2, so that the signature verification process is possible.

In the signature verification apparatus v, as shown in FIG. 16, the input/output section 2 writes the document data x and i-th signature $\sigma_i$ of $\{k+k_1+(i-1)k_0\}$ which are verification objects into the memory 1 by a signature verifier's operation (ST41).

The control section $10v$ reads a signature order i based on identifiers $ID_1$ to $ID_i$ in the document data x in the memory 1 (ST42).

The arithmetic device 5 divides the i-th signature $\sigma_i$ in the memory 1 into two, and writes the obtained signature value $z_i$ of lower k bits and the second partial data $\sigma_{i-1,M}$ of the remaining $\{k_1+(i-1)k_0\}$ bits into the memory 1 (ST43).

The public key cryptosystem signature verification section $8v$ applies an RSA signature verification function of a key length k bits to the signature value $z_i$ in the memory 1 based on the public key in the memory 1 by the public key cryptosystem ($f_i(z_i)=s_i\|w_i'$), and writes the obtained operation result $s_i$ of upper ($k_2+k_0$) bits and the operation result $w_i'$ of lower $k_1$ bits into the memory 1 (ST44).

The $G_i$ function operation section 7 applies the second random function $G_i$ to the operation result $w_i'$ in the memory 1, and writes the obtained second random function value $g_i$ ($=G_i(w_i')$) of ($k_2+k_0$) bits into the memory 1.

The arithmetic device 5 executes the exclusive OR of the second random function value $g_i$ and the operation result $s_i$ in the memory 1, and writes an obtained operation result ($\sigma_{i-1,R}\|r_i$) of ($k_2+k_0$) bits into the memory 1 (ST45).

Moreover, the arithmetic device 5 divides the operation result ($\sigma_{i-1,R}\|r_i$) in the memory 1 into the third partial data $\sigma_{i-1,R}$ of upper $k_2$ bits and the random data $r_i$ of lower $k_0$ bits, and writes them into the memory 1.

Here, when the signature order i read in the step ST42 is three or more (ST46; YES), the control section $10v$ advances to step ST47.

In the step ST47, the $H_i'$ function operation section 7 applies the first random function $H_i'$ to the second partial data $\sigma_{i-1,M}$, operation result ($\sigma_{i-1,R}\|r_i$), and document data x in the memory 1, and writes the obtained first random function value $w_i$ ($=H_i'(x\|\sigma_{i-1,M}\|\sigma_{i-1,R}\|r_i)$) of $k_1$ bits into the memory 1.

The arithmetic device 5 executes the exclusive OR of the operation result $w_i'$ and the first random function value $w_i$ in the memory 1, and writes the obtained first partial data $\sigma_{i-1,L}$ into the memory 1 (ST48).

Thereafter, the arithmetic device 5 concatenates the first to third partial data $\sigma_{i-1,L}$, $\sigma_{i-1,M}$, $\sigma_{i-1,R}$ in the memory 1 to thereby restore the i−1-th signature $\sigma_{i-1}$.

The control section $10v$ updates the i−1-th signature $\sigma_{i-1}$ and the document data x as the i-th signature $\sigma_i$ and the document data x to thereby update the memory 1 (ST49).

After completing this update, the control section $10v$ regards i−1 as i (ST50), and controls the respective sections 1 to $8v$ in such a manner as to execute the above-described steps ST41 to ST49 again. Additionally, before the control for the re-execution, the control section $10v$ deletes the identification information $ID_i$ of the signer whose order is i-th from the document data x, and replaces the obtained document data x' with the document data x.

By a loop process of the steps ST41 to ST50, the signature order i read in step ST42 is less than 3 (ST46; NO), and i=2 is assumed (ST51; YES).

At this time, steps ST52, ST53 similar to the above-described steps ST47, ST48 are executed. That is, the $H_i'$ function operation section 7 applies the first random function $H_i'$ to the second partial data $\sigma_{i-1,M}$, operation result ($\sigma_{1,R}\|r_2$), and document data x, and writes the obtained first random function value $w_2$ ($=H_2'(x\|\sigma_{1,M}\|\sigma_{1,R}\|r_2)$) of $k_1$ bits into the memory 1 (ST52). The arithmetic device 5 executes the exclusive OR of the operation result $w_2'$ and the first random function value $w_2$ in the memory 1, and writes the obtained first partial data $\sigma_{1,L}$ into the memory 1 (ST53).

Here, the control section $10v$ verifies whether or not the first partial data $\sigma_{1,L}$ obtained in the step ST53 agrees with a preset value $0^{k}1$. When the both disagree with each other, the process advances to step ST55 to reject the signature $\sigma_i$. Additionally, here, a case where the both agree with each other will be described.

When the both agree with each other, the control section $10v$ advances to the above-described step ST49.

Next, the process advances to the steps ST49, ST50, ST41 to ST46, the signature order image read in the step ST42 is less than 3 (ST46; NO), and i=1 is assumed instead of i=2 (ST51; NO).

At this time, the control section $10v$ verifies whether or not the third partial data $\sigma_{0,R}$ in the memory 1 agrees with a preset value $0^{k}2$. When the both disagree with each other, the process advances to step ST55 to reject the signature $\sigma_i$. Additionally, here, a case where the both agree with each other will be described.

At this time, steps ST57, ST58 similar to the above-described steps ST47, ST48 are executed. That is, the $H_i'$ function operation section 7 applies the first random function $H_i'$ to the second partial data $\sigma_{0,M}$, operation result ($\sigma_{0,R}\|r_1$), and document data x in the memory 1, and writes the obtained first random function value $w_1$ ($=H_1'(x\|\sigma_{0,M}\|\sigma_{0,R}\|r_1)$) of $k_1$ bits into the memory 1 (ST57). The arithmetic device 5 executes the exclusive OR of the operation result $w_1'$ and the first random function value $w_1$ in the memory 1, and writes the obtained first partial data $\sigma_{0,L}$ into the memory 1 (ST58).

Here, the control section $10v$ verifies whether or not the first partial data $\sigma_{0,L}$ obtained in the step ST58 agrees with a preset value $0^{k}1$. When the both disagree with each other, the process advances to step ST55 to reject the signature $\sigma_i$. When the both agree with each other, the control section $10v$ accepts signature $\sigma_i$ (ST60), and ends the signature verification process.

(Roles of Random Number $r_i$ and Random Functions $H_i'$, $G_i$)

Roles of the random number $r_i$, and first and second random functions $H_i'$, $G_i$ are similar to those of the first embodiment.

(Reason Why Multisignature System is Safe)

An intuitive reason why the multisignature system is safe is similar to that of the first embodiment.

(Security against Active Attack)

A security against the active attack is similar to that of the first embodiment.

As described above, according to the present embodiment, as shown in FIG. 7, to generate the i-th signature $\sigma_i$, the i−1-th signature $\sigma_{i-1}$ is divided, and the portion ($\sigma_{i-1,L}$, $\sigma_{i-1,M}$) exceeding ($k_0+k_2$) bits when concatenating the random number $r_i$ of $k_0$ bits is excluded from the input of the binary operation on the input side of the signature generation function. Accordingly, the size of the operation result $s_i$ of the binary operation is set to be constant at ($k_0+k_2$) bits, and, as a result, the input size (key length k bits) of the signature generation function is set to be constant. Therefore, in a case where the ground for security is laid in the difficulty in the inverse function operation of the trapdoor one-way function, represented by the RSA problem, even when the signature order advances, the increase of the size of the key can be inhibited.

In detail, in the present embodiment, unlike the first embodiment in which the first random function $H_i'$ is applied to all the previous signature $\sigma_{i-1}$, the signer divides the previous signature $\sigma_{i-1}$ into three, inputs the second and third partial data $\sigma_{i-1,M}$ and $\sigma_{i-1,R}$ only to the first random function, and reflects the first partial data $\sigma_{i-1,L}$ as the exclusive OR in the output of the first random function $H_i'$. Accordingly, while keeping the tight security, the size of the multisignature can be set to be smaller than that of the conventional technique, and communication costs can be reduced.

Here, the size of the portion $\sigma_{i-1,L}$ to be reflected in the input of the signature generation function may be set to be smaller than an output size $k_1$ of the first random function $H_i'$. At this time, the exclusive OR of $\sigma_{i-1,L}$ is executed with respect to a predetermined portion of the output of the first random function $H_i'$, and $\sigma_{i-1,L}$ may be restored from this portion also in the signature verification process.

Moreover, since the input/output size of the signature generation function does not depend on the signature order, the signature generation function for use in a usual signature generation application is usable.

It is to be noted that the present embodiment may be modified as follows.

For example, in the signature generation process, the information $0^{2k_1+k_2}$ in which $2k_1+k_2$ 0s are concatenated has been used as the signature initial value $\sigma_0$, but the present invention is not limited to this, and may be modified in such a manner as to use an arbitrary fixed value of $2k_1+k_2$ bits or more. Furthermore, the embodiment may be modified in such a manner as to utilize fixed values having different sizes as long as the value is $k_2$ bits or more. Additionally, when the fixed value of $k_2$ bits or more is used, to ensure the security, the signature generation process and the signature verification process concerning the first and second signatures of the second embodiment need to be replaced with those concerning the first and second signatures of the first embodiment.

It is to be noted that although the description is omitted, needless to say, a modification similar to the first embodiment can be realized in a case where the RSA function is used as the signature generation function.

Furthermore, in the step ST36, the case where the concatenated data of the operation results $s_i$ and $w_i'$ is input into the signature generation function has been described, but the present invention is not limited to this, and may be modified in such a manner as to input another data generated from the operation results $s_i$ and $w_i'$ into the signature generation function. For example, a modification is considered in which $s_i$ is changed to $s_i'$ using the third random function G', the operation result of the exclusive OR of $w_i'$ and G'($s_i$) is obtained as w'', and data ($s_i'\|w_i''$) constituted by concatenating $s_i'$ and $w_i''$ is input into the signature generation function.

Moreover, the random functions H'', G common to the respective signers may be used with respect to first random functions $H_1'$ to $H_N'$ and second random functions $G_1$ to $G_N$. Furthermore, the first random function may be set to be equal to the second random function, and the random function operation sections may be reduced to one section.

The method described in each embodiment can be stored, as a program executable by a computer, on a storage medium such as a magnetic disk (e.g., floppy (registered trademark) disk or hard disk), optical disk (e.g., CD-ROM or DVD), magneto-optical disk (MO), or semiconductor memory, and distributed.

The storage medium can have any storage format as long as it is a storage medium which can store a program and be read by a computer.

Some of processes to implement the embodiment may be executed by an OS (Operating System) or MW (middleware) such as database management software or network software running on a computer on the basis of instructions of a program installed from a storage medium in the computer.

The storage medium of the present invention is not limited to a medium separated from the computer. It also includes a storage medium which downloads the program transmitted over a LAN or the Internet and stores or temporarily stores the program.

The number of storage media is not limited to one. The storage medium of the present invention also includes a case in which the processing of the embodiment is executed from a plurality of media. Any medium arrangement can be used.

The computer of the present invention executes each processing of the embodiment on the basis of the program stored on the storage medium. The computer can be either a single apparatus such as a personal computer or a system formed by concatenating a plurality of apparatuses through a network.

The computer of the present invention is not limited to a personal computer and also includes an arithmetic processing apparatus or microcomputer included in an information processing device. "Computer" is a general term for devices and apparatuses capable of implementing the function of the present invention by a program.

The present invention is not limited to the above-described embodiments. Accordingly, in practicing the invention, various modifications of constituent elements can be made without departing from its spirit or scope. In addition, various inventions can be formed by appropriately combining a plurality of constituent elements disclosed in the embodiments. For example, some constituent elements may be omitted from those described in the embodiments. Alternatively, constituent elements of different embodiments may appropriately be combined.

What is claimed is:

1. A multisignature method implemented by a computer programmed as a multisignature generation apparatus which generates i-th signature $\sigma_i$ with respect to document data x based on i−1-th signature $\sigma_{i-1}$ and document data x generated by another multisignature generation apparatus, the method comprising:

dividing, by a processor of the computer, the i−1-th signature $\sigma_{i-1}$ into two, and obtaining second partial data $\sigma_{i-1,R}$ of $k_2$ bits and remaining first partial data $\sigma_{i-1,L}$;

generating random number data $r_i$ of $k_0$ bits;

applying a first random function $H_i'$ to the first partial data $\sigma_{i-1,L}$, the second partial data $\sigma_{i-1,R}$, the random number data $r_i$, and the document data x, and obtaining a first random function value $w_i$ of $k_1$ bits;

applying a second random function $G_i$ to the first random function value $w_i$, and obtaining a second random function value $g_i$ of $(k_2+k_0)$ bits;

executing binary operation of the second random function value $g_i$, the second partial data $\sigma_{i-1,R}$, and the random number data $r_i$, and obtaining an operation result $s_i$ of $(k_2+k_0)$ bits;

applying a signature generation function to data of k bits based on the operation result $s_i$ and the first random function value $w_i$, and obtaining a signature value $z_i$ of k bits;

concatenating the first partial data $\sigma_{i-1,L}$ to the signature value $z_i$, and generating i-th signature $\sigma_i (=\sigma_{i-1,L}\|z_i)$; and outputting this i-th signature $\sigma_i$.

2. The multisignature generating method according to claim 1, wherein the signature generation function is an RSA signature generation function.

3. A multisignature method implemented by a computer programmed as a multisignature generation apparatus which generates i-th signature $\sigma_i$ with respect to document data x based on i−1-th signature $\sigma_{i-1}$ and document data x generated by another multisignature generation apparatus, the method comprising:

dividing, by a processor of the computer, the i−1-th signature $\sigma_{i-1}$ into three, and obtaining first partial data $\sigma_{i-1,L}$ of $k_1$ bits, third partial data $\sigma_{i-1,R}$ of $k_2$ bits, and remaining second partial data $\sigma_{i-1,M}$;

generating random number data $r_i$ of $k_0$ bits;

applying a first random function $H_i'$ to the second partial data $\sigma_{i-1,M}$, the third partial data $\sigma_{i-1,R}$, the random number data $r_i$, and the document data x, and obtaining a first random function value $w_i$ of $k_1$ bits;

executing binary operation of the first random function value $w_i$ and the first partial data $\sigma_{i-1,L}$, and obtaining an operation result $w_i'$ of $k_1$ bits;

applying a second random function $G_i$ to the operation result $w_i'$, and obtaining a second random function value $g_i$ of $(k_2+k_0)$ bits;

executing binary operation of the second random function value $g_i$, the third partial data $\sigma_{i-1,R}$, and the random number data $r_i$, and obtaining an operation result $s_i$ of $(k_2+k_0)$ bits;

applying a signature generation function to data of k bits based on the operation results $s_i$ and $w_i'$, and obtaining a signature value $z_i$ of k bits;

concatenating the second partial data $\sigma_{i-1,M}$ to the signature value $z_i$, and generating i-th signature $\sigma_i(=\sigma_{i-1,M}\|z_i)$; and outputting this i-th signature $\sigma_i$.

4. A multisignature generation apparatus which generates i-th signature $\sigma_i$ with respect to document data x based on i−1-th signature $\sigma_{i-1}$ and document data x generated by another multisignature generation apparatus, the apparatus comprising:

an input device configured to input the i−1-th signature $\sigma_{i-1}$ and the document data x;

a memory configured to store the i−1-th signature $\sigma_{i-1}$ and the document data x;

a dividing device configured to divide the input i−1-th signature $\sigma_{i-1}$ into second partial data $\sigma_{i-1,R}$ of $k_2$ bits and remaining first partial data $\sigma_{i-1,L}$;

a random number generation device configured to generate random number data $r_i$ of $k_0$ bits;

a first random function operation device configured to operate a first random function $H_i'$ for the first partial data $\sigma_{i-1,L}$, the second partial data $\sigma_{i-1,R}$, the random number data $r_i$, and the document data x, and obtain a first random function value $w_i$ of $k_1$ bits;

a second random function operation device configured to operate a second random function $G_i$ for the first random function value $w_i$, and obtain a second random function value $g_i$ of $(k_2+k_0)$ bits;

a binary operation device configured to execute binary operation of the second random function value $g_i$, the second partial data $\sigma_{i-1,R}$, and the random number data $r_i$, and obtain an operation result $s_i$ of $(k_2+k_0)$ bits;

a signature value generation device configured to generate a signature value $z_i$ of k bits by executing a signature generation function for data of k bits based on the operation result $s_i$ and the first random function value $w_i$;

a concatenating device configured to concatenate the first partial data $\sigma_{i-1,L}$ to the signature value $z_i$ in such a manner as to generate i-th signature $\sigma_i (=\sigma_{i-1,L}\|z_i)$; and an output device configured to output this i-th signature $\sigma_i$ and the document data x.

5. The multisignature generation apparatus according to claim 4, wherein the binary operation is an exclusive OR.

6. The multisignature generation apparatus according to claim 4, wherein the input device inputs a constant $\sigma_0$ of $k_2$ bits or more as the i−1-th signature $\sigma_{i-1}$, when i=1.

7. The multisignature generation apparatus according to claim 4, further comprising: a document data generation device configured to generate document data x by concatenating i-th signer's identification information $ID_i$ to document data x' including identification information of the first to i−1-th signers, before inputting the document data x into the input device.

8. A multisignature verification apparatus which verifies validity of a multiplied signature $\sigma_i$, when i−1-th signature $\sigma_{i-1}$ is divided into second partial data $\sigma_{i-1,R}$ of $k_2$ bits, and remaining first partial data $\sigma_{i-1,L}$, random number data $r_i$ of $k_0$ bits is generated, a first random function $H_i'$ is applied to the first partial data $\sigma_{i-1,L}$, the second partial data $\sigma_{i-1,R}$, the random number data $r_i$, and the document data x to operate a first random function value $w_i$ of $k_1$ bits, a second random function $G_i$ is applied to the first random function value $w_i$ to operate a second random function value $g_i$ of $(k_2+k_0)$ bits, an operation result $s_i$ of $(k_2+k_0)$ bits is operated by binary operation of the second random function value $g_i$, the second partial data $\sigma_{i-1,R}$, and the random number data $r_i$, a signature generation function is applied to data of k bits based on the operation result $s_i$ and the first random function value $w_i$ to operate a signature value $z_i$ of k bits, and i-th signature $\sigma_i$ $(=\sigma_{i-1,L}\|z_i)$ generated by concatenating the first partial data $\sigma_{i-1,L}$ to the signature value $z_i$, and the document data x are input, the verification apparatus comprising:

a memory configured to store the i-th signature $\sigma_i$ and the document data x;

an input device configured to input the i-th signature $\sigma_i$ and the document data x into the storage device;

a first dividing device configured to divide the i-th signature $\sigma_i$ in the storage device into a signature value $z_i$ of k bits and remaining first partial data $\sigma_{i-1,L}$;

a verification function operation device configured to operate a signature verification function for the signature value $z_i$, and obtain an operation result $s_i$ of $(k_2+k_0)$ bits, and a first random function value $w_i$ of $k_1$ bits;

a second random function operation device configured to operate a second random function $G_i$ for the first random function value $w_i$, and obtain a second random function value $g_i$ of $(k_2+k_0)$ bits;

a binary operation device configured to execute binary operation of the second random function value $g_i$, and the operation result $s_i$, and obtain a binary operation result of $(k_2+k_0)$ bits;

a first random function operation device configured to operate a first random function $H_i'$ for the first partial data $\sigma_{i-1,L}$, the binary operation result, and the document data x, and obtain a first random function value $w_i'$ of $k_1$ bits;

a signature verification device configured to mutually verify the first random function value $w_i$ obtained by the verification function operation device and the first random function value $w_i'$ obtained by the first random function operation device, and judge that the i-th signature is valid, when both the values agree with each other;

a second dividing device configured to divide the binary operation result into the second partial data $\sigma_{i-1,R}$ of $k_2$ bits and the random number data $r_i$ of $k_0$ bits, when the i-th signature is valid;

a signature restoration device configured to restore the i−1-th signature $\sigma_{i-1}$ obtained by concatenating the first partial data $\sigma_{i-1,L}$ and the second partial data $\sigma_{i-1,R}$;

an update device configured to update the i−1-th signature $\sigma_{i-1}$ and the document data x as the i-th signature $\sigma_i$ and the document data x, and update the storage device; and a control device configured to control the first dividing device, the verification function operation device, the second random function operation device, the binary operation device, the first random function operation device, the signature verification device, the second dividing device, the signature restoration device, and the update device in such a manner as to re-execute the devices, when the update by the update device is completed.

9. The multisignature verification apparatus according to claim 8, wherein the control device further comprises:

a signature accepting device configured to verify whether or not signature $\sigma_0$ agrees with a preset signature initial value $\sigma_0$, instead of the control for the re-execution, in a case where the signature $\sigma_{i-1}$ updated by the update device is the signature $\sigma_0$, and accept the multiplied signature $\sigma_i$, when the both agree with each other.

10. The multisignature verification apparatus according to claim 8, wherein the control device comprises a document data replacement device configured to delete identification information $ID_i$ of a signer whose order is i-th from the document data x, and replace obtained document data x' with the document data x before the control for the re-execution.

11. A multisignature generation apparatus which generates i-th signature $\sigma_i$ with respect to document data x based on i−1-th signature $\sigma_{i-1}$ and document data x generated by another multisignature generation apparatus, the apparatus comprising:

an input device configured to input the i−1-th signature $\sigma_{i-1}$ and the document data x;

a memory configured to store the i−1-th signature $\sigma_{i-1}$ and the document data x a dividing device configured to divide the i−1-th signature $\sigma_{i-1}$ into first partial data $\sigma_{i-1,L}$ of $k_1$ bits, third partial data $\sigma_{i-1,R}$ of $k_2$ bits, and remaining second partial data $\sigma_{i-1,M}$;

a random number generation device configured to generate random number data $r_i$ of $k_0$ bits;

a first random function operation device configured to operate a first random function $H_i'$ for the second partial data $\sigma_{i-1,M}$, the third partial data $\sigma_{i-1,R}$, the random number data $r_i$, and the document data x, and obtain a first random function value $w_i$ of $k_1$ bits;

a first binary operation device configured to execute binary operation of the first random function value $w_i$ and the first partial data $\sigma_{i-1,L}$, and obtain an operation result $w_i'$ of $k_1$ bits;

a second random function operation device configured to operate a second random function $G_i$ for the operation result $w_i'$, and obtain a second random function value $g_i$ of $(k_2+k_0)$ bits;

a second binary operation device configured to execute binary operation of the second random function value $g_i$, the third partial data $\sigma_{i-1,R}$, and the random number data $r_i$, and obtain an operation result $s_i$ of $(k_{2+k0})$ bits;

a signature value generation device configured to generate a signature value $z_i$ of k bits by executing a signature generation function for data of k bits based on the operation results $s_i$ and $w_i'$;

a concatenating device configured to concatenate the second partial data $\sigma_{i-1,M}$ to the signature value $z_i$, and generate i-th signature $\sigma_i$ ($=\sigma_{i-1,M}\|z_i$); and an output device configured to output this i-th signature $\sigma_1$.

12. The multisignature generation apparatus according to claim 11, wherein the binary operation by the first and second binary operation devices is an exclusive OR.

13. The multisignature generation apparatus according to claim 11, wherein the input device inputs a constant $\sigma_0$ of $(2k_1+k_2)$ bits or more as the i−1-th signature $\sigma_{i-1}$, when i=1.

14. The multisignature generation apparatus according to claim 11, further comprising: a document data generation device configured to generate document data x by concatenating i-th signer's identification information $ID_i$ to document data x' including identification information of the first to i−1-th signers, before inputting the document data x into the input device.

15. A multisignature verification apparatus which verifies validity of a multiplied signature $\sigma_i$, when i−1-th signature $\sigma_{i-1}$ is divided into first partial data $\sigma_{i-1,L}$ of $k_1$ bits, third partial data $\sigma_{i-1,R}$ of $k_2$ bits, and remaining second partial data $\sigma_{i-1,M}$, random number data $r_i$ of $k_2$ bits is generated, a first random function $H_i'$ is applied to the second partial data $\sigma_{i-1,M}$, the third partial data $\sigma_{i-1,R}$, the random number data $r_i$, and the document data x to operate a first random function value $w_i$ of $k_1$ bits, an operation result $w_i'$ of $k_1$ bits is operated by binary operation of the first random function value $w_i$ and the first partial data $\sigma_{i-1,L}$, a second random function $G_i$ is applied to the operation result $w_i'$ to operate a second random function value $g_i$ of $(k_2+k_0)$ bits, an operation result $s_i$ of $(k_2+k_0)$ bits is operated by binary operation of the second random function value $g_i$, the third partial data $\sigma_{i-1,R}$, and the random number data $r_i$, a signature generation function is applied to data of k bits based on the operation results $s_i$ and $w_i'$ to operate a signature value $z_i$ of k bits, and i-th signature $\sigma_i(=\sigma_{i-1,M}\|z_i)$ generated by concatenating the second partial data $\sigma_{i-1,M}$ to the signature value $z_i$, and the document data x are input, the verification apparatus comprising:

a memory configured to store the i-th signature $\sigma_i$ and the document data x;

an input device configured to input the i-th signature $\sigma_i$ and the document data x into the storage device;

a first dividing device configured to divide the i-th signature $\sigma$ in the storage device into a signature value $z_i$ of k bits and remaining second partial data $\sigma_{i-1,M}$;

a verification function operation device configured to operate a signature verification function for the signature value $z_i$, and obtain an operation result $s_i$ of $(k_{2+k0})$ bits, and an operation result $w_i'$ of $k_1$ bits;

a second random function operation device configured to operate a second random function $G_i$ for the operation result $w_i'$, and obtain a second random function value $g_i$ of $(k_2+k_0)$ bits;

a first binary operation device configured to execute binary operation of the second random function value $g_i$ and the operation result $s_i$, and obtain a binary operation result of $(k_2+k_0)$ bits;

a second dividing device configured to divide the binary operation result into third partial data $\sigma_{i-1,R}$ of $k_2$ bits and random number $r_i$ of $k_0$ bits;

a first random function operation device configured to operate a first random function $H_i'$ for the second partial data $\sigma_{i-1,M}$, the binary operation result, and the document data x, and obtain a first random function value $w_i$ of $k_1$ bits;

a second binary operation device configured to execute binary operation of the operation result $w_i'$ obtained by the verification function operation device and the first random function value $w_i$ obtained by the first random function operation device, and obtain first partial data $\sigma_{i-1,L}$ of $k_1$ bits;

a signature restoration device configured to restore the i−1-th signature $\sigma_{i-1}$ obtained by concatenating the first partial data $\sigma_{i-1,L}$, the second partial data $\sigma_{i-1,M}$, and the third partial data $\sigma_{i-1,R}$;

an update device configured to update the i−1-th signature $\sigma_{i-1}$ and the document data x as the i-th signature $\sigma_i$ and the document data x, and update the storage device;

a control device configured to control the first dividing device, the verification function operation device, the second random function operation device, the first binary operation device, the second dividing device, the first random function operation device, the second binary operation device, the signature restoration device, and the update device in such a manner as to re-execute the devices, when the update by the update device is completed;

a signature rejection device configured to verify whether or not first partial data $\sigma_{1,L}$ obtained by the second binary operation device agrees with a preset value, when the second binary operation device is re-executed in a signature order i=2 by the control device, and reject the multiplied signature $\sigma_i$, when the both disagree with each other; and a signature accepting device configured to verify whether or not first partial data $\sigma_{0,L}$ obtained by the second binary operation agrees with a preset signature initial value, when the second binary operation device is re-executed in the signature order i=1 by the control device, and accept the multiplied signature $\sigma_i$, when the both agree with each other.

16. The multisignature verification apparatus according to claim 15, wherein the control device comprises: a document data replacement device configured to delete identification information $ID_i$ of a signer whose order is first from the document data x, and replace obtained document data x' with the document data x before the control for the re-execution.

17. A computer-readable storage medium storing a program which, when executed by a computer of a multisignature generation apparatus, causes the computer to generate i-th signature $\sigma_i$ with respect to document data x based on i−1-th signature $\sigma_{i-1}$ and document data x generated by another multisignature generation apparatus, the program comprising:

a first program code which allows the computer to successively execute an input process to input the i−1-th signature $\sigma_{i-1}$ and the document data x into a memory;

a second program code which allows the computer to successively execute a dividing process to divide the i−1-th signature $\sigma_{i-1}$ in the memory into second partial data $\sigma_{i-1,R}$ of $k_2$ bits and remaining first partial data $\sigma_{i-1,L}$;

a third program code which allows the computer to successively execute a random number generation process to generate random number data $r_i$ of $k_0$ bits;

a fourth program code which allows the computer to successively execute a first random function operation process to apply a first random function $H_i'$ to the first partial data $\sigma_{i-1,L}$, the second partial data $\sigma_{i-1,R}$, the random number data $r_i$, and the document data x, and operate a first random function value $w_i$ of $k_1$ bits;

a fifth program code which allows the computer to successively execute a second random function operation process to apply a second random function $G_i$ to the first random function value $w_i$, and operate a second random function value $g_i$ of $(k_2+k_0)$ bits;

a sixth program code which allows the computer to successively execute a binary operation process to execute a binary operation process to execute binary operation of the second random function value $g_i$, the second partial data $\sigma_{i-1,R}$, and the random number data $r_i$, and obtain an operation result $s_i$ of $(k_2+k_0)$ bits;

a seventh program code which allows the computer to successively execute a signature value generation process to apply a signature generation function to data of k bits based on the operation result $s_i$ and the first random function value $w_i$, and generate a signature value $z_i$ of k bits;

an eighth program code which allows the computer to successively execute a concatenating process to concatenate the first partial data $\sigma_{i-1,L}$ to the signature value $z_i$, and generate i-th signature $\sigma_i (=\sigma_{i-1,L}\|z_i)$; and a ninth program code which allows the computer to successively execute an output process to output this i-th signature $\sigma_i$ and the document data x.

18. The computer readable medium according to claim 17, wherein the binary operation process operates an exclusive OR as the binary operation.

19. The computer readable medium according to claim 17, wherein the input process inputs a constant $\sigma_0$ of $k_2$ bits or more as the i−1-th signature $\sigma_{i-1}$, when i=1.

20. The computer readable medium according to claim 17, further comprising: a tenth program code which allows the computer to successively execute a document data generation process to concatenate i-th signer's identification information $ID_i$ to document data x' including identification information of the first to i−1-th signers, and generate document data x before inputting the document data x into the input process.

21. A computer-readable storage medium storing a program, which when executed by a computer of a multisignature verification apparatus, causes the computer to verify validity of a multiplied signature $\sigma_i$, when i−1-th signature $\sigma_{i-1}$ is divided into second partial data $\sigma_{i-1,R}$ of $k_2$ bits, and remaining first partial data $\sigma_{i-1,L}$, random number data $r_i$ of $k_0$ bits is generated, a first random function $H_i'$ is applied to the first partial data $\sigma_{i-1,L}$; the second partial data $\sigma_{i-1,R}$, the random number data $r_i$, and the document data x to operate a first random function value $w_i$ of $k_1$ bits, a second random function $G_i$ is applied to the first random function value $w_i$ to operate a second random function value $g_i$ of $(k_2+k_0)$ bits, an operation result $s_i$ of $(k_2+k_0)$ bits is operated by binary operation of the second random function value $g_i$, the second partial data $\sigma_{i-1,R}$, and the random number data $r_i$, a signature generation function is applied to data of k bits based on the operation result $s_i$ and the first random function value $w_i$ to operate a signature value $z_i$ of k bits, and i-th signature $\sigma_i$ ($=\sigma_{i-1,L}\|z_i$) generated by concatenating the first partial data $\sigma_{i-1,L}$ to the signature value $z_i$, and the document data x are input, the program comprising:

a first program code which allows the computer to successively execute an input process to input the i-th signature $\sigma_i$ and the document data x into a memory;

a second program code which allows the computer to successively execute a first dividing process to divide the i-th signature $\sigma_i$ in the memory into a signature value $z_i$ of k bits and remaining first partial data $\sigma_{i-1,L}$;

a third program code which allows the computer to successively execute a verification function operation process to apply a signature verification function having a key length of k bits to the signature value $z_i$, and operate an operation result $s_i$ of $(k_2+k_0)$ bits, and a first random function value $w_i$ of $k_1$ bits;

a fourth program code which allows the computer to successively execute a second random function operation process to apply a second random function $G_i$ to the first random function value $w_i$, and operate a second random function value $g_i$ of $(k_2+k_0)$ bits;

a fifth program code which allows the computer to successively execute a binary operation process to execute binary operation of the second random function value $g_i$ and the operation result $s_i$, and obtain a binary operation result of $(k_2+k_0)$ bits;

a sixth program code which allows the computer to successively execute a first random function operation process to apply a first random function $H_i'$ to the first partial data $\sigma_{i-1,L}$, the binary operation result, and the document data x, and operate a first random function value $w_i'$ of $k_1$ bits;

a seventh program code which allows the computer to successively execute a signature verification process to mutually verify the first random function value $w_i$ obtained by the verification function operation process and the first random function value $w_i'$ obtained by the first random function operation process, and judge that the i-th signature is valid, when both the values agree with each other;

an eight program code which allows the computer to successively execute a second dividing process to divide the binary operation result into the second partial data $\sigma_{i-1,R}$ of $k_2$ bits and the random number data $r_i$ of $k_0$ bits, when the i-th signature is valid;

a ninth program code which allows the computer to successively execute a signature restoration process to concatenate the first partial data $\sigma_{i-1,L}$ and the second partial data $\sigma_{i-1,R}$, and restore the i–1-th signature $\sigma_{i-1}$;

a tenth program code which allows the computer to successively execute an update process to update the i–1-th signature $\sigma_{i-1}$ and the document data x as the i-th signature $\sigma_i$ and the document data x, and update the memory; and an eleventh program code which allows the computer to successively execute a control process to control the first dividing process, the verification function operation process, the second random function operation process, the binary operation process, the first random function operation process, the signature verification process, the second dividing process, the signature restoration process, and the update process in such a manner as to re-execute the processes, when the update by the update process is completed.

22. The computer readable medium according to claim 21, wherein the control process includes:

a signature accepting process to verify whether or not signature $\sigma_0$ agrees with a preset signature initial value $\sigma_0$, instead of the control for the re-execution, in a case where the signature $\sigma_{i-1}$ updated by the update process is the signature $\sigma_0$, and accept the multiplied signature $\sigma_i$, when the both agree with each other.

23. The computer readable medium according to claim 21, wherein the control process includes:

a document data replacement process to delete identification information $ID_i$ of a signer whose order is i-th from the document data x, and replace obtained document data x' with the document data x before the control for the re-execution.

24. A computer-readable storage medium storing a program which, when executed by a computer of a multisignature generation apparatus, causes the computer to generate i-th signature $\sigma_i$ with respect to document data x based on i–1-th signature $\sigma_{i-1}$ and document data x generated by another multisignature generation apparatus, the program comprising:

a first program code which allows the computer to successively execute an input process to input the i–1-th signature $\sigma_{i-1}$ and the document data x into a memory;

a second program code which allows the computer to successively execute a dividing process to divide the i–1-th signature $\sigma_{i-1}$ in the memory into first partial data $\sigma_{i-1,L}$ of $k_1$ bits, third partial data $\sigma_{i-1,R}$ of $k_2$ bits, and remaining second partial data $\sigma_{i-1,M}$;

a third program code which allows the computer to successively execute a random number generation process to generate random number data $r_i$ of $k_0$ bits;

a fourth program code which allows the computer to successively execute a first random function operation process to apply a first random function $H_i'$ to the second partial data $\sigma_{i-1,M}$, the third partial data $\sigma_{i-1,R}$, the random number data $r_i$, and the document data x, and operate a first random function value $w_i$ of $k_1$ bits;

a fifth program code which allows the computer to successively execute a first binary operation process to execute binary operation of the first random function value $w_i$ and the first partial data $\sigma_{i-1,L}$, and obtain an operation result $w_i'$ of $k_1$ bits;

a sixth program code which allows the computer to successively execute a second random function operation process to apply a second random function $G_i$ to the operation result $w_i'$, and operate a second random function value $g_i$ of $(k_2+k_0)$ bits;

a seventh program code which allows the computer to successively execute a second binary operation process to execute binary operation of the second random function value $g_i$, the third partial data $\sigma_{i-1,R}$, and the random number data $r_i$, and obtain an operation result $s_i$ of $(k_2+k_0)$ bits;

an eighth program code which allows the computer to successively execute a signature value generation process to apply a signature generation function to data of k bits based on the operation results $s_i$ and $w_i'$, and generate a signature value $z_i$ of k bits;

a ninth program code which allows the computer to successively execute a concatenating process to concatenate the second partial data $\sigma_{i-1,M}$ to the signature value $z_i$, and generate i-th signature $\sigma_i(=\sigma_{i-1,M}\|z_i)$; and a tenth program code which allows the computer to successively execute an output process to output this i-th signature $\sigma_i$.

25. The computer readable medium according to claim 24, wherein the first and second binary operation processes operate an exclusive OR.

26. The computer readable medium according to claim 24, wherein the input process inputs a constant $\sigma_0$ of $(2k_1+k_2)$ bits or more as the i–1-th signature $\sigma_{i-1}$, when i=1.

27. The computer readable medium according to claim 24 or 25, further comprising:

an eleventh program code which allows the computer to successively execute a document data generation process to concatenate i-th signer's identification information $ID_i$ to document data x' including identification information of the first to i–1-th signers, and generate document data x before inputting the document data x into the input process.

28. A computer-readable storage medium storing a program which, when executed by a computer of a multisignature verification apparatus, causes the computer to verify validity of a multiplied signature $\sigma_i$, when i–1-th signature $\sigma_{i-1}$ is divided into first partial data $\sigma_{i-1,L}$ of $k_1$ bits, third partial data $\sigma_{i-1,R}$ of $k_2$ bits, and remaining second partial data $\sigma_{i-1,M}$, random number data $r_i$ of $k_0$ bits is generated, a first random function $H_i'$ is applied to the second partial data $\sigma_{i-1,M}$, the third partial data $\sigma_{i-1,R}$, the random number data $r_i$, and the document data x to operate a first random function value $w_i$ of $k_1$ bits, an operation result $w_i'$ of $k_1$ bits is operated by binary operation of the first random function value $w_i$ and the first partial data $\sigma_{i-1,L}$, a second random function $G_i$ is applied to the operation result $w_i'$ to operate a second random function value $g_i$ of $(k_2+k_0)$ bits, an operation result $s_i$ of $(k_2+k_0)$ bits is operated by binary operation of the second random function value $g_i$, the third partial data $\sigma_{i-1,R}$, and the random number data $r_i$, a signature generation function is applied to data of k bits based on the operation results $s_i$ and $w_i'$ to operate a signature value $z_i$ of k bits, and i-th signature $\sigma_i(=\sigma_{i-1,M}\|z_i$ generated by concatenating the second partial data $\sigma_{i-1,M}$ to the signature value $z_i$, and the document data x are input, the program comprising:

a first program code which allows the computer to successively execute an input process to input the i-th signature $\sigma_i$ and the document data x into a memory;

a second program code which allows the computer to successively execute a first dividing process to divide the i-th signature $\sigma_i$ in the memory into a signature value $z_i$ of k bits and remaining second partial data $\sigma_{i-1,M}$;

a third program code which allows the computer to successively execute a verification function operation process to apply a signature verification function to the signature value $z_i$, and operate an operation result $s_i$ of $(k_2+k_0)$ bits, and an operation result $w_i'$ of $k_1$ bits;

a fourth program code which allows the computer to successively execute a second random function operation process to apply a second random function $G_i$ to the operation result $w_i'$, and operate a second random function value $g_i$ of $(k_2+k_0)$ bits;

a fifth program code which allows the computer to successively execute a first binary operation process to execute binary operation of the second random function value $g_i$, and the operation result $s_i$, and obtain a binary operation result of $(k_2+k_0)$ bits;

a sixth program code which allows the computer to successively execute a second dividing process to divide the binary operation result into third partial data $\sigma_{i-1,R}$ of $k_2$ bits and random number $r_i$ of $k_0$ bits;

a seventh program code which allows the computer to successively execute a first random function operation process to apply a first random function $H_i'$ to the second partial data $\sigma_{i-1,M}$, the binary operation result, and the document data x, and operate a first random function value $w_i$ of $k_1$ bits;

an eighth program code which allows the computer to successively execute a second binary operation process to execute binary operation of the operation result $w_i'$ obtained by the verification function operation process and the first random function value $w_i$ obtained by the first random function operation process, and obtain first partial data $\sigma_{i-1,L}$ of $k_1$ bits;

a ninth program code which allows the computer to successively execute a signature restoration process to concatenate the first partial data $\sigma_{i-1,L}$, the second partial data $\sigma_{i-1,M}$, and the third partial data $\sigma_{i-1,R}$ and restore the i–1-th signature $\sigma_{i-1}$;

a tenth program code which allows the computer to successively execute an update process to update the i–1-th signature $\sigma_{i-1}$ and the document data x as the i-th signature $\sigma_i$ and the document data x, and update the storage process;

an eleventh program code which allows the computer to successively execute a control process to control the first dividing process, the verification function operation process, the second random function operation process, the first binary operation process, the second dividing process, the first random function operation process, the second binary operation process, the signature restoration process, and the update process in such a manner as to re-execute the processes, when the update by the update process is completed;

a twelfth program code which allows the computer to successively execute a signature rejection process to verify whether or not first partial data $\sigma_{1,L}$ obtained by the second binary operation process agrees with a preset value, when the second binary operation process is re-executed in a signature order i=2 by the control process, and reject the multiplied signature $\sigma_i$, when the both disagree with each other; and a thirteenth program code which allows the computer to successively execute a signature accepting process to verify whether or not first partial data $\sigma_{0,L}$ obtained by the second binary operation process agrees with a preset signature initial value, when the second binary operation process is re-executed in the signature order i=1 by the control process, and accept the multiplied signature $\sigma_i$, when the both agree with each other.

29. The computer readable medium according to claim 28, wherein the control process includes:

a document data replacement process to delete identification information $ID_i$ of a signer whose order is i-th from the document data x, and replace obtained document data x' with the document data x before the control for the re-execution.

30. A multisignature system comprising: N (N=1, 2, ..., i, ..., N–1, N) multisignature generation apparatuses having a function of generating i-th signature $\sigma_i$ with respect to document data x based on i−1-th signature $\sigma_{i-1}$ generated by other multisignature generation apparatuses; and one multisignature verification apparatus, each of the multisignature generation apparatuses comprising:
- an input device configured to input the i−1-th signature $\sigma_{i-1}$ and the document data x;
- a memory configured to store the i−1-th signature $\sigma_{i-1}$ and the document data x;
- a dividing device configured to divide the input i−1-th signature $\sigma_{i-1}$ into second partial data $\sigma_{i-1,R}$ of $k_2$ bits and remaining first partial data $\sigma_{i-1,L}$;
- a random number generation device configured to generate random number data $r_i$ of $k_0$ bits;
- a first random function operation device configured to apply a first random function $H_i'$ to the first partial data $\sigma_{i-1,L}$, the second partial data $\sigma_{i-1,R}$, the random number data $r_i$, and the document data x, and operate a first random function value $w_i$ of $k_1$ bits;
- a second random function operation device configured to apply a second random function $G_i$ to the first random function value $w_i$, and operate a second random function value $g_i$ of $(k_2+k_0)$ bits;
- a binary operation device configured to execute binary operation of the second random function value $g_i$, the second partial data $\sigma_{i-1,R}$, and the random number data $r_i$, and obtain an operation result $s_i$ of $(k_2+k_0)$ bits;
- a signature value generation device configured to apply a signature generation function to data of k bits based on the operation result $s_i$ and the first random function value $w_i$, and generate a signature value $z_i$ of k bits;
- a concatenating device configured to concatenate the first partial data $\sigma_{i-1,L}$ to the signature value $z_i$ in such a manner as to generate i-th signature $\sigma_i (=\sigma_{i-1,L}\|z_i)$; and
- an output device configured to output this i-th signature $\sigma_i$ and the document data x.

31. The multisignature system according to claim 30, wherein the multisignature verification apparatus comprises:
- a memory configured to store the i-th signature $\sigma_i$ and the document data x;
- an input device configured to input the i-th signature $\sigma_i$ and the document data x into the storage device;
- a first dividing device configured to divide the i-th signature $\sigma_i$ in the storage device into a signature value $z_i$ of k bits and remaining first partial data $\sigma_{i-1,L}$;
- a verification function operation device configured to apply a signature verification function to the signature value $z_i$, and operate an operation result $s_i$ of $(k_2+k_0)$ bits, and a first random function value $w_i$ of $k_1$ bits;
- a second random function operation device configured to apply a second random function $G_i$ to the first random function value $w_i$, and operate a second random function value $g_i$ of $(k_2+k_0)$ bits;
- a binary operation device configured to execute binary operation of the second random function value $g_i$, and the operation result $s_i$, and obtain a binary operation result of $(k_2+k_0)$ bits;
- a first random function operation device configured to apply a first random function $H_i'$ to the first partial data $\sigma_{i-1,L}$, the binary operation result, and the document data x, and operate a first random function value $w_i'$ of $k_1$ bits;
- a signature verification device configured to mutually verify the first random function value $w_i$ obtained by the verification function operation device and the first random function value $w_i'$ obtained by the first random function operation device, and judge that the i-th signature is valid, when both the values agree with each other;
- a second dividing device configured to divide the binary operation result into the second partial data $\sigma_{i-1,R}$ of $k_2$ bits and the random number data $r_i$ of $k_0$ bits, when the i-th signature is valid;
- a signature restoration device configured to concatenate the first partial data $\sigma_{i-1,L}$ and the second partial data $\sigma_{i-1,R}$, and restore the i−1-th signature $\sigma_{i-1}$;
- an update device configured to update the i−1-th signature $\sigma_{i-1}$ and the document data x as the i-th signature $\sigma_i$ and the document data x, and update the storage device; and
- a control device configured to control the first dividing device, the verification function operation device, the second random function operation device, the binary operation device, the first random function operation device, the signature verification device, the second dividing device, the signature restoration device, and the update device in such a manner as to re-execute the devices, when the update by the update device is completed.

32. A multisignature system comprising: N (N=1, 2, ..., i, ..., N−1, N) multisignature generation apparatuses having a function of generating i-th signature $\sigma_i$ with respect to document data x based on i−1-th signature $\sigma_{i-1}$ generated by other multisignature generation apparatuses; and one multisignature verification apparatus, each of the multisignature generation apparatuses comprising:
- an input device configured to input the i−1-th signature $\sigma_{i-1}$ and the document data x;
- a memory configured to store the i−1-th signature $\sigma_{i-1}$ and the document data x;
- a dividing device configured to divide the i−1-th signature $\sigma_{i-1}$ into first partial data $\sigma_{i-1,L}$ of $k_1$ bits, third partial data $\sigma_{i-1,R}$ of $k_2$ bits, and remaining second partial data $\sigma_{i-1,M}$;
- a random number generation device configured to generate random number data $r_i$ of $k_0$ bits;
- a first random function operation device configured to apply a first random function $H_i'$ to the second partial data $\sigma_{i-1,M}$, the third partial data $\sigma_{i-1,R}$, the random number data $r_i$, and the document data x, and operate a first random function value $w_i$ of $k_1$ bits;
- a first binary operation device configured to execute binary operation of the first random function value $w_i$ and the first partial data $\sigma_{i-1,L}$ and obtain an operation result $w_i'$ of $k_1$ bits;
- a second random function operation device configured to apply a second random function $G_i$ to the operation result $w_i'$, and operate a second random function value $g_i$ of $(k_2+k_0)$ bits;
- a second binary operation device configured to execute binary operation of the second random function value $g_i$, the third partial data $\sigma_{i-1,R}$, and the random number data $r_i$, and obtain an operation result $s_i$ of $(k_2+k_0)$ bits;
- a signature value generation device configured to apply a signature generation function to data of k bits based on the operation results $s_i$ and $w_i'$, and generate a signature value $z_i$ of k bits;
- concatenating device configured to concatenate the second partial data $\sigma_{i-1,M}$ to the signature value $z_i$, and generate i-th signature $\sigma_i (=\sigma_{i-1,M}\|z_i)$; and
- an output device configured to output this i-th signature $\sigma_i$.

33. The multisignature system according to claim 32, wherein the multisignature verification apparatus comprising:

a memory configured to store the i-th signature $\sigma_i$ and the document data x;

an input device configured to input the i-th signature $\sigma_i$ and the document data x into the storage device;

a first dividing device configured to divide the i-th signature $\sigma_i$ in the storage device into a signature value $z_i$ of k bits and remaining second partial data $\sigma_{i-1,M}$;

a verification function operation device configured to apply a signature verification function to the signature value $z_i$, and operate an operation result $s_i$ of $(k_2+k_0)$ bits, and an operation result $w_i'$ of $k_1$ bits;

a second random function operation device configured to apply a second random function $G_i$ to the operation result $w_i'$, and operate a second random function value $g_i$ of $(k_2+k_0)$ bits;

a first binary operation device configured to execute binary operation of the second random function value $g_i$, and the operation result $s_i$, and obtain a binary operation result of $(k_2+k_0)$ bits;

a second dividing device configured to divide the binary operation result into third partial data $\sigma_{i-1,R}$ of $k_2$ bits and random number $r_i$ of $k_0$ bits;

a first random function operation device configured to apply a first random function $H_i'$ to the second partial data $\sigma_{i-1,M}$, the binary operation result, and the document data x, and operate a first random function value $w_i$ of $k_1$ bits;

a second binary operation device configured to execute binary operation of the operation result $w_i'$ obtained by the verification function operation device and the first random function value $w_i$ obtained by the first random function operation device, and obtain first partial data $\sigma_{i-1,L}$ of $k_1$ bits;

a signature restoration device configured to concatenate the first partial data $\sigma_{i-1,L}$, the second partial data $\sigma_{i-1,M}$, and the third partial data $\sigma_{i-1,R}$, and restore the i−1-th signature $\sigma_{i-1}$;

an update device configured to update the i−1-th signature $\sigma_{i-1}$ and the document data x as the i-th signature $\sigma_i$ and the document data x, and update the storage device;

a control device configured to control the first dividing device, the verification function operation device, the second random function operation device, the first binary operation device, the second dividing device, the first random function operation device, the second binary operation device, the signature restoration device, and the update device in such a manner as to re-execute the devices, when the update by the update device is completed;

a signature rejection device configured to verify whether or not first partial data $\sigma_{1,L}$ obtained by the second binary operation device agrees with a preset value, when the second binary operation device is re-executed in a signature order i=2 by the control device, and reject the multiplied signature $\sigma_i$, when the both disagree with each other; and a signature accepting device configured to verify whether or not first partial data $\sigma_{0,L}$ obtained by the second binary operation agrees with a preset signature initial value, when the second binary operation device is re-executed in the signature order i=1 by the control device, and accept the multiplied signature $\sigma_i$, when the both agree with each other.

* * * * *